(12) United States Patent
Ganzel

(10) Patent No.: US 10,940,843 B2
(45) Date of Patent: Mar. 9, 2021

(54) VEHICLE BRAKE SYSTEM HAVING PLUNGER POWER SOURCE

(71) Applicant: Kelsey-Hayes Company, Livonia, MI (US)

(72) Inventor: Blaise J. Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 0 days.

(21) Appl. No.: 14/868,187

(22) Filed: Sep. 28, 2015

(65) Prior Publication Data

US 2016/0016571 A1 Jan. 21, 2016

Related U.S. Application Data

(63) Continuation-in-part of application No. 13/843,587, filed on Mar. 15, 2013, now Pat. No. 9,321,444.
(Continued)

(51) Int. Cl.
*B60T 13/12* (2006.01)
*B60T 13/16* (2006.01)
(Continued)

(52) U.S. Cl.
CPC .......... *B60T 13/168* (2013.01); *B60T 7/042* (2013.01); *B60T 8/4018* (2013.01);
(Continued)

(58) Field of Classification Search
CPC ....... B60T 7/042; B60T 13/745; B60T 8/4266
See application file for complete search history.

(56) References Cited

U.S. PATENT DOCUMENTS

| 2,233,377 A | 2/1941 | Talbot |
| 5,147,117 A * | 9/1992 | Quinn .................. B60T 8/4863 303/113.2 |

(Continued)

FOREIGN PATENT DOCUMENTS

| AU | 7789700 A | 4/2001 |
| CN | 102582605 A | 7/2012 |

(Continued)

OTHER PUBLICATIONS

Machine translation of WO 2012017037, spec and claims, retrieved Oct. 1, 2019 (Year: 2019).*

(Continued)

*Primary Examiner* — Bradley T King
(74) *Attorney, Agent, or Firm* — Robert James Harwood

(57) ABSTRACT

A brake system includes first and second wheel brakes, a reservoir, and a brake pedal unit having a housing and a pair of output pistons slidably disposed in the housing. The output pistons generate brake actuating pressure during a manual push-through mode for actuating the first and second wheel brakes. The system further includes a plunger assembly having a housing having first and second ports, a motor driving an actuator, and a piston connected to the actuator. The piston pressurizes a first chamber when the piston is moving in a first direction to provide fluid flow out of the first port. The piston pressurizes a second chamber when the piston is moving in a second direction opposite the first direction to provide fluid flow out of the second port. The first and second ports are selectively in fluid communication with the wheel brakes.

8 Claims, 18 Drawing Sheets

Related U.S. Application Data

(60) Provisional application No. 62/068,134, filed on Oct. 24, 2014, provisional application No. 62/055,698, filed on Sep. 26, 2014.

(51) Int. Cl.
*B60T 7/04* (2006.01)
*B60T 8/40* (2006.01)
*B60T 13/74* (2006.01)

(52) U.S. Cl.
CPC .......... *B60T 8/4081* (2013.01); *B60T 13/166* (2013.01); *B60T 13/745* (2013.01)

(56) References Cited

U.S. PATENT DOCUMENTS

| | | | |
|---|---|---|---|
| 5,163,744 A * | 11/1992 | Tierney | B60T 8/4863 303/113.2 |
| 5,312,172 A * | 5/1994 | Takeuchi | B60T 7/042 303/113.1 |
| 5,557,935 A | 9/1996 | Ganzel | |
| 5,655,819 A * | 8/1997 | Emig | B60T 8/36 303/113.1 |
| 5,758,930 A | 6/1998 | Schiel et al. | |
| 5,836,659 A | 11/1998 | Feigel et al. | |
| 6,079,797 A | 6/2000 | Ganzel | |
| 6,158,825 A | 12/2000 | Schunck et al. | |
| 6,494,546 B1 | 12/2002 | Feigel | |
| 6,547,342 B1 | 4/2003 | Schaust et al. | |
| 6,860,569 B1 | 3/2005 | Campau et al. | |
| 7,004,551 B2 | 2/2006 | Yokoyama et al. | |
| 7,063,393 B2 | 6/2006 | Suzuki et al. | |
| 7,552,978 B2 | 6/2009 | Yokoyama et al. | |
| 7,651,176 B2 | 1/2010 | Inoue et al. | |
| 7,922,264 B2 | 4/2011 | Baumann et al. | |
| 8,038,229 B2 | 10/2011 | Leiber et al. | |
| 8,333,442 B2 | 12/2012 | Hatano et al. | |
| 9,487,201 B2 | 11/2016 | Linden | |
| 2004/0251095 A1 | 12/2004 | Simard et al. | |
| 2007/0199436 A1 | 8/2007 | Ikeda et al. | |
| 2007/0278855 A1 | 12/2007 | Hatano | |
| 2009/0033144 A1 * | 2/2009 | Ikeda | B60T 8/3225 303/20 |
| 2010/0026083 A1 | 2/2010 | Leiber et al. | |
| 2010/0114444 A1 | 5/2010 | Verhagen et al. | |
| 2011/0120121 A1 | 5/2011 | Sprocq et al. | |
| 2011/0120122 A1 | 5/2011 | Cagnac et al. | |
| 2012/0013173 A1 | 1/2012 | Leiber et al. | |
| 2012/0169112 A1 | 7/2012 | Jungbecker et al. | |
| 2012/0306261 A1 | 12/2012 | Leiber et al. | |
| 2013/0021025 A1 | 1/2013 | Krishnaiah et al. | |
| 2013/0312404 A1 | 11/2013 | Ganzel et al. | |

FOREIGN PATENT DOCUMENTS

| | | |
|---|---|---|
| DE | 102007016863 A1 | 10/2008 |
| DE | 102008014462 A1 | 9/2009 |
| DE | 102010038956 | 8/2010 |
| DE | 102010040097 A1 | 3/2011 |
| DE | 102010023865 A1 | 12/2011 |
| DE | 102011080312 A1 | 2/2012 |
| EP | 2100784 A2 | 9/2009 |
| EP | 2233377 A1 | 9/2010 |
| EP | 2233377 B1 | 9/2010 |
| EP | 2969677 | 9/2016 |
| JP | 2012250559 A | 12/2012 |
| KR | 1020020055441 A | 7/2002 |
| KR | 1020110120928 A | 11/2011 |
| WO | 2008122468 A1 | 10/2008 |
| WO | 2010006978 A1 | 1/2010 |
| WO | 2010006998 A1 | 1/2010 |
| WO | 2012017037 A2 | 2/2012 |
| WO | 2012058330 A2 | 5/2012 |
| WO | 2014145454 A1 | 9/2014 |

OTHER PUBLICATIONS

International search report of PCT/US2015/052714, dated Jan. 8, 2016.
European Extended Search Report, Application No. 14762531.3, dated Sep. 28, 2016.
European Extended Search Report, dated May 28, 2018, Application No. 15843830.9, filed Sep. 28, 2015.
PCT International Search Report and Written Opinion, Application No. PCT/US2014/030222, dated Jul. 3, 2014.
Chinese Notification of First Office Action, dated Dec. 3, 2018, Application No. 201580051607.5, filed Sep. 28, 2015.

* cited by examiner

VEHICLE BRAKE SYSTEM HAVING PLUNGER POWER SOURCE

CROSS-REFERENCE TO RELATED APPLICATIONS

This application is a continuation-in-part patent application of U.S. patent application Ser. No. 13/843,587, filed Mar. 15, 2013, the disclosure of which is incorporated herein by reference in its entirety. This application also claims the benefit of U.S. Provisional Application No. 62/055,698, filed Sep. 26, 2014, and U.S. Provisional Application No. 62/068,134, filed Oct. 24, 2014, the disclosures of which are incorporated herein by reference in their entirety.

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

Some braking systems are configured such that the pressures at each of the wheel brakes can be controlled independently (referred to as a multiplexing operation) from one another even though the brake system may includes a single source of pressure. Thus, valves downstream of the pressure source are controlled between their open and closed positions to provide different braking pressures within the wheel brakes. Such multiplex systems, which are all incorporated by reference herein, are disclosed in U.S. Pat. No. 8,038,229, U.S. Patent Application Publication No. 2010/0026083, U.S. Patent Application Publication No. 2012/0013173, and U.S. Patent Application Publication No. 2012/0306261.

SUMMARY OF THE INVENTION

This invention relates to a plunger assembly for use as a pressure source for a vehicle brake system. A brake system includes first and second wheel brakes, a reservoir, and a brake pedal unit having a housing and a pair of output pistons slidably disposed in the housing. The output pistons are operable during a manual push-through mode such that the pair of output pistons are movable to generate brake actuating pressure at first and second outputs for actuating the first and second wheel brakes, respectively. The system further includes a plunger assembly having a housing having first and second ports, a motor driving an actuator, and a piston connected to the actuator. The piston is slidably mounted within the housing. The piston pressurizes a first chamber when the piston is moving in a first direction to provide fluid flow out of the first port. The piston pressurizes a second chamber when the piston is moving in a second direction opposite the first direction to provide fluid flow out of the second port. The first and second ports are selectively in fluid communication with the first and second wheel brakes for actuation of the first and second wheel brakes from pressurized fluid within the first and second chambers. Fluid may flow from the first and second wheel brakes into the first chamber when the piston moves in the second direction.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
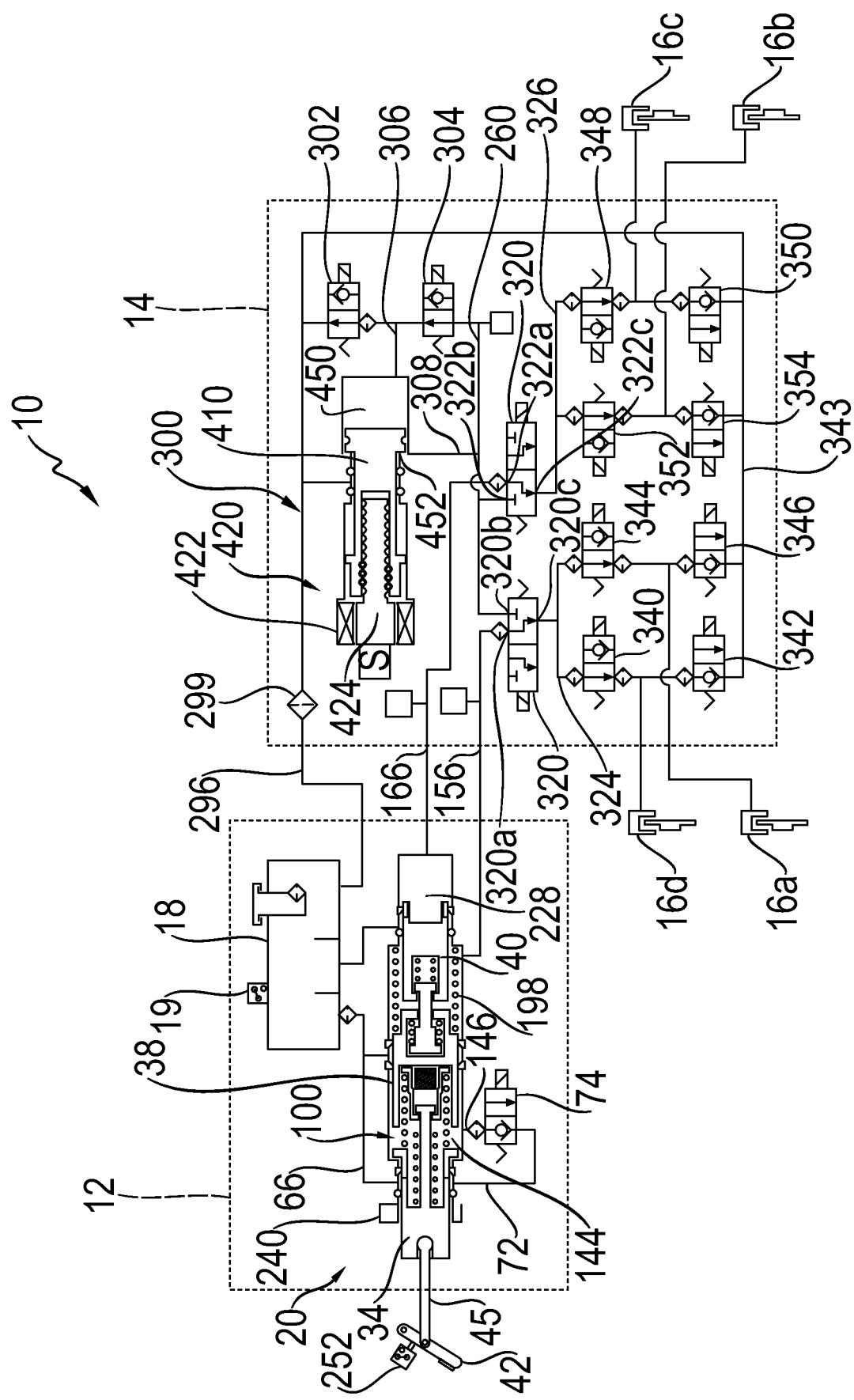
FIG. 1 is a schematic illustration of a first embodiment of a brake system.

Referring now to the drawings, there is schematically illustrated in FIG. 1 a first embodiment of a vehicle brake system, indicated generally at 10. The brake system 10 is a hydraulic boost braking system in which boosted fluid pressure is utilized to apply braking forces for the brake system 10. The brake system 10 may suitably be used on a ground vehicle such as an automotive vehicle having four wheels with a wheel brake associated with each wheel. Furthermore, the brake system 10 can be provided with other braking functions such as anti-lock braking (ABS) and other slip control features to effectively brake the vehicle, as will be discussed below.

The brake system 10 generally includes a first block or brake pedal unit assembly, indicated by broken lines 12, and a second block or hydraulic control unit, indicated by broken lines 14. The various components of the brake system 10 are housed in the brake pedal unit assembly 12 and the hydraulic control unit 14. The brake pedal unit assembly 12 and the hydraulic control unit 14 may include one or more blocks or housings made from a solid material, such as aluminum, that has been drilled, machined, or otherwise formed to house the various components. Fluid conduits may also be formed in the housings to provide fluid passageways between the various components. The housings of the brake pedal unit assembly 12 and the hydraulic control unit 14 may be single structures or may be made of two or more parts assembled together. As schematically shown, the hydraulic control unit 14 is located remotely from the brake pedal unit assembly 12 with hydraulic lines hydraulically coupling the brake pedal unit assembly 12 and the hydraulic control unit 14. Alternatively, the brake pedal unit assembly 12 and the hydraulic control unit 14 may be housed in a single housing. It should also be understood that the grouping of components as illustrated in FIG. 1 is not intended to be limiting and any number of components may be housed in either of the housings.

The brake pedal unit assembly 12 cooperatively acts with the hydraulic control unit 14 for actuating wheel brakes 16a, 16b, 16c, and 16d. The wheel brakes 16a, 16b, 16c, and 16d can be any suitable wheel brake structure operated by the application of pressurized brake fluid. The wheel brake 16a, 16b, 16c, and 16d may include, for example, a brake caliper mounted on the vehicle to engage a frictional element (such as a brake disc) that rotates with a vehicle wheel to effect braking of the associated vehicle wheel. The wheel brakes 16a, 16b, 16c, and 16d can be associated with any combination of front and rear wheels of the vehicle in which the brake system 10 is installed. For example, for a vertically split system, the wheel brakes 16a and 16d may be associated with the wheels on the same axle. For a diagonally split brake system, the wheel brakes 16a and 16b may be associated with the front wheel brakes.

The brake pedal unit assembly 12 includes a fluid reservoir 18 for storing and holding hydraulic fluid for the brake system 10. The fluid within the reservoir 18 may be held generally at atmospheric pressure or can store the fluid at other pressures if so desired. The brake system 10 may include a fluid level sensor 19 for detecting the fluid level of the reservoir. The fluid level sensor 19 may be helpful in determining whether a leak has occurred in the system 10.

The brake pedal control unit assembly 12 includes a brake pedal unit (BPU), indicated generally at 20. The brake pedal unit 20 is also schematically shown enlarged in FIG. 2. It should be understood that the structural details of the components of the brake pedal unit 20 illustrate only one example of a brake pedal unit 20. The brake pedal unit 20 could be configured differently having different components than that shown in FIGS. 1 and 2.

The brake pedal unit 20 includes a housing 24 (shown broken away in FIG. 2) having various bores formed in for slidably receiving various cylindrical pistons and other components therein. The housing 24 may be formed as a single unit or include two or more separately formed portions coupled together. The housing 24 generally includes a first bore 26, an intermediate second bore 28, and a third bore 30. The second bore 28 has a larger diameter than the first bore 26 and the third bore 30. The brake pedal unit 20 further includes an input piston 34, a primary piston 38, and a secondary piston 40. The input piston 34 is slidably disposed in the first bore 26. The primary piston 38 is slidably disposed in the second bore 28. The secondary piston 40 is slidably disposed in the third bore 30.

Figure 2:
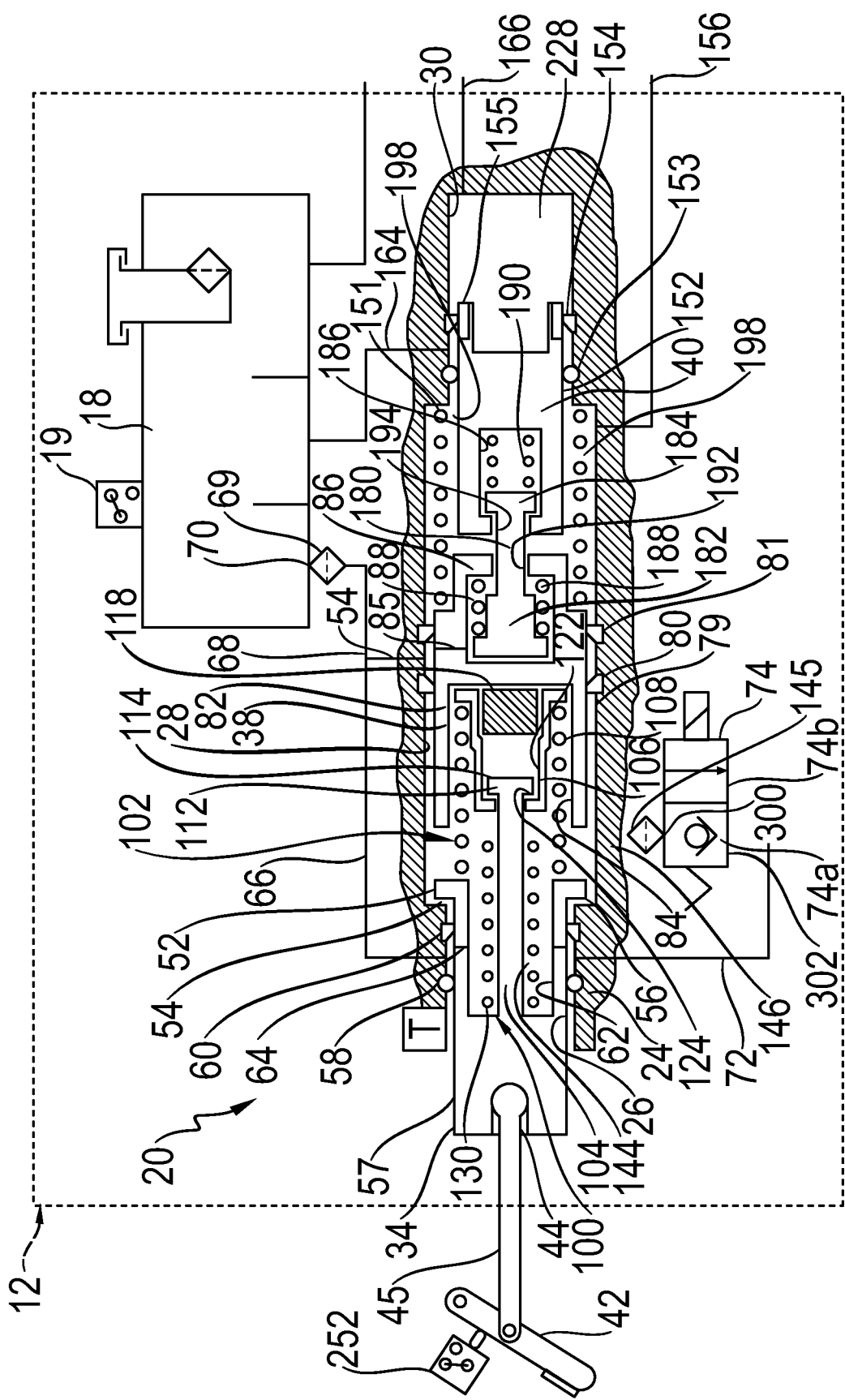
FIG. 2 is an enlarged schematic sectional view of the brake pedal unit assembly of the brake system of FIG. 1 shown in its rest position.

A brake pedal, indicated schematically at 42 in FIGS. 1 and 2, is coupled to a first end 44 of the input piston 34 via an input rod 45. The input rod 45 can be coupled directly to the input piston 34 or can be indirectly connected through a coupler (not shown). The input piston 34 includes an enlarged second end 52 that defines a shoulder 54. In the rest position shown in FIGS. 1 and 2, the shoulder 54 of the input piston engages with a shoulder 56 formed between the first and second bores 26 and 28 of the housing 24. An outer cylindrical surface 57 of the input piston 34 is engaged with a seal 58 and a lip seal 60 mounted in grooves formed in the housing 24. The outer cylindrical surface 57 may be continuous along its length or it may be stepped having two or more different diameter portions. The input piston 34 includes a central bore 62 formed through the second end 52. One or more lateral passageways 64 are formed through the input piston 34. The lateral passageways 64 extend from the outer cylindrical surface 57 to the central bore 62 to provide fluid communication therebetween. The brake pedal unit 20 is in a "rest" position as shown in FIGS. 1 and 2. In the "rest" position, the pedal 42 has not been depressed by the driver of the vehicle. In the rest position, the passageways 64 of the input piston 34 are between the seals 58 and 60. In this position, the passageways 64 are in fluid communication with a conduit 66 formed though the housing 24. The conduit 66 is in fluid communication with a conduit 68 formed in the housing 24. The conduit 68 is in fluid communication with a reservoir port 70 connected to the reservoir 18. A filter 69 may be disposed in the port 70 or the conduit 68. The conduits 66 and 68 can be formed by various bores, grooves and passageways formed in the housing 24. In the rest position, the passageways 64 are also in fluid communication with a conduit 72 formed in the housing 24 which leads to a simulation valve 74. The simulation valve 74 may be a cut off valve which may be electrically operated. The simulation valve 74 may be mounted in the housing 24 or may be remotely located therefrom The primary piston 38 is slidably disposed in the second bore 28 of the housing 24. An outer wall 79 of the primary piston 38 is engaged with a lip seal 80 and a lip seal 81 mounted in grooves formed in the housing 24. The primary piston 38 includes a first end 82 having a cavity 84 formed therein. A second end 86 of the primary piston 38 includes a cavity 88 formed therein. One or more passageways 85 are formed in the primary piston 38 which extend from the cavity 88 to the outer wall of the primary piston 38. As shown in FIG. 2, the passageway 85 is located between the lip seals 80 and 81 when the primary piston 38 is in its rest position. For reasons which will be explained below, the passageway 85 is in selective fluid communication with a conduit 154 which is in fluid communication with the reservoir 18.

The central bore 62 of the input piston 34 and the cavity 84 of the primary piston 38 house various components defining a pedal simulator, indicated generally at 100. A caged spring assembly, indicated generally at 102, is defined by a pin 104, a retainer 106, and a low rate simulator spring 108. The pin 104 is shown schematically as being part of the input piston 34 and disposed in the central bore 62. The pin 104 could be configured as a pin having a first end which is press fit or threadably engaged with the input piston 34. The pin 104 extends axially within the central bore 62 and into the cavity 84 of the primary piston 38. A second end 112 of the pin 104 includes a circular flange 114 extending radially outwardly therefrom. The second end 112 is spaced from an elastomeric pad 118 disposed in the cavity 84. The elastomeric pad 118 is axially aligned with the second end 112 of the pin 104, the reason for which will be explained below. The retainer 106 of the caged spring assembly 102 includes a stepped through bore 122. The stepped through bore 122 defines a shoulder 124. The second end 112 of the pin 104 extends through the through bore 122. The flange 114 of the pin 104 engages with the shoulder 124 of the retainer 106 to prevent the pin 104 and the retainer 106 from separating from each other. One end of the low rate simulator spring 108 engages with the second end 52 of the input piston 34, and the other end of the low rate simulator spring 108 engages with the retainer 106 to bias the retainer 106 in a direction away from the pin 104.

The pedal simulator 100 further includes a high rate simulator spring 130 which is disposed about the pin 104. The terms low rate and high rate are used for description purposes and are not intended to be limiting. It should be understood that that the various springs of the pedal simulator 100 may have any suitable spring coefficient or spring rate. In the illustrated embodiment, the high rate simulator spring 130 preferably has a higher spring rate than the low rate simulator spring 108. One end of the high rate simulator spring 130 engages with the bottom of the central bore 62 of the input piston 34. The other end of the high rate simulator spring 130 is shown in FIG. 2 in a non-engaged position and spaced away from an end of the retainer 106. The housing 24, the input piston 34 (and its seals), and the primary piston 38 (and its seals) generally define a fluid simulation chamber 144. The simulation chamber 144 is in fluid communication with a conduit 146 which is in fluid communication with the simulation valve 74. A filter 145 may be housed within the conduit 146.

As discussed above, the brake pedal unit 20 includes the primary and secondary pistons 38 and 40 that are disposed in the second and third bores 28 and 32, respectively, which are formed in the housing 24. The primary and secondary pistons 38 and 40 are generally coaxial with one another. A primary output conduit 156 is formed in the housing 24 and is in fluid communication with the second bore 28. The primary output conduit 156 may be extended via external piping or a hose connected to the housing 24. A secondary output conduit 166 is formed in the housing 24 and is in fluid communication with the third bore 30. The secondary output conduit 166 may be extended via external piping or a hose connected to the housing 24. As will be discussed in detail below, rightward movement of the primary and secondary pistons 38 and 40, as viewing FIGS. 1 and 2, provides pressurized fluid out through the conduits 156 and 166, respectively. A return spring 151 is housed in the second bore 28 and biases the primary piston 38 in the leftward direction.

The secondary piston 40 is slidably disposed in the third bore 30. An outer wall 152 of the secondary piston is engaged with a lip seal 153 and a lip seal 154 mounted in grooves formed in the housing 24. A secondary pressure chamber 228 is generally defined by the third bore 30, the secondary piston 40, and the lip seal 154. Rightward movement of the secondary piston 40, as viewing FIGS. 1 and 2, causes a buildup of pressure in the secondary pressure chamber 228. The secondary pressure chamber 228 is in fluid communication with the secondary output conduit 166 such that pressurized fluid is selectively provided to the hydraulic control unit 14. One or more passageways 155 are formed in the secondary piston 40. The passageway 155 extends between the outer wall of the primary piston 38 and a right-hand end of the secondary piston 40. As shown in FIG. 2, the passageway 155 is located between the seal 153 and the lip seal 154 when the secondary piston 40 is in its rest position, the reason for which will be explained below. For reasons which will be explained below, the passageway 155 is in selective fluid communication with a conduit 164 which is in fluid communication with the reservoir 18.

A primary pressure chamber 198 is generally defined by the second bore 28, the primary piston 38, the secondary piston 40, the lip seal 81, and the seal 153. Although the various seals shown in the drawings are schematically represented as O-ring or lip seals, it should be understood that they can have any configuration. Rightward movement of the primary piston 38, as viewing FIGS. 1 and 2, causes a buildup of pressure in the primary pressure chamber 198. The primary pressure chamber 198 is in fluid communication with the primary output conduit 156 such that pressurized fluid is selectively provided to the hydraulic control unit 14.

The primary and secondary pistons 38 and 40 may be mechanically connected together such that there is limited play or movement between the pistons 38 and 40. This type of connection permits the primary and secondary pistons 38 and 40 to move relative to one another by relatively small increments to compensate for pressure and/or volume differences in their respective output circuits. However, under certain failure modes it is desirable that the secondary piston 40 is connected to the primary piston 38. For example, if the brake system 10 is under a manual push through mode, as will be explained in detail below, and additionally fluid pressure is lost in the output circuit relative to the secondary piston 40, such as for example, in the conduit 166, the secondary piston 40 will be forced or biased in the rightward direction due to the pressure within the primary chamber 1798. If the primary and secondary pistons 38 and 40 were not connected together, the secondary piston 40 would freely travel to its further most right-hand position, as viewing FIGS. 1 and 2, and the driver would have to depress the pedal 42 a distance to compensate for this loss in travel. However, because the primary and secondary pistons 38 and 40 are connected together, the secondary piston 40 is prevented from this movement and relatively little loss of travel occurs in this type of failure.

The primary and secondary pistons 38 and 40 can be connected together by any suitable manner. For example, as schematically shown in FIGS. 1 and 2, a locking member 180 is disposed and trapped between the primary and secondary pistons 38 and 40. The locking member 180 includes a first end 182 and a second end 184. The first end 182 is trapped within the cavity 88 of the second end 86 of the primary piston 38. The second end 184 of the locking member 180 is trapped within a recess or cavity 186 formed in the secondary piston 40. The first and second ends 182 and 184 may include enlarged head portions which are trapped behind narrower openings 192 and 194 of the cavities 88 and 186, respectively. A first spring 188 is housed within the cavity 88 of the primary piston 38 and biases the locking member 180 in a direction towards the primary piston 38 and away from the secondary piston 40. A second spring 190 is housed within the cavity 186 of the secondary piston 40 and biases the locking member 180 in a direction towards the primary piston 38 and away from the secondary piston 40. The springs 188 and 190 and the locking member 180 maintain the first and second output piston at a spaced apart distance from one another while permitting limited movement towards and away from each other by compression of the springs 188 or 190. This limited play mechanical connection permits the primary and secondary pistons 38 and 40 to move relative to one another by small increments to compensate for pressure and/or volume differences in their respective output circuits.

Referring back to FIG. 1, the system 10 may further include a travel sensor, schematically shown at 240 in FIG. 1, for producing a signal that is indicative of the length of travel of the input piston 34 which is indicative of the pedal travel. The system 10 may also include a switch 252 for producing a signal for actuation of a brake light and to provide a signal indicative of movement of the input piston 34. The brake system 10 may further include sensors such as pressure transducers 257 and 259 for monitoring the pressure in the conduits 156 and 166, respectively.

The system 10 further includes a source of pressure in the form of a plunger assembly, indicated generally at 300. As will be explained in detail below, the system 10 uses the plunger assembly 300 to provide a desired pressure level to the wheel brakes 16a-d during a normal boosted brake apply. Fluid from the wheel brakes 16a-d may be returned to the plunger assembly 300 or diverted to the reservoir 18.

The system 10 further includes a first isolation valve 320 and a second isolation valve 322 (or referred to as switching valves or base brake valves). The isolation valves 320 and 322 may be solenoid actuated three way valves. The isolation valves 320 and 322 are generally operable to two positions, as schematically shown in FIG. 1. The first isolation valve 320 has a port 320a in selective fluid communication with the primary output conduit 156 which is in fluid communication with the first output pressure chamber 198. A port 320b is in selective fluid communication with a boost conduit 260. A port 320c is in fluid communication with a conduit 324 which is selectively in fluid communication with the wheel brakes 16a and 16d. The second isolation valve 322 has a port 322a in selective fluid communication with the conduit 166 which is in fluid communication with the second output pressure chamber 228. A port 322b is in selective fluid communication with the boost conduit 260. A port 322c is in fluid communication with a conduit 326 which is selectively in fluid communication with the wheel brakes 16b and 16c.

The system 10 further includes various valves (slip control valve arrangement) for permitting controlled braking operations, such as ABS, traction control, vehicle stability control, and regenerative braking blending. A first set of valves includes an apply valve 340 and a dump valve 342 in fluid communication with the conduit 324 for cooperatively supplying brake fluid received from the boost valves to the wheel brake 16d, and for cooperatively relieving pressurized brake fluid from the wheel brake 16d to a reservoir conduit 343 in fluid communication with the reservoir conduit 296. A second set of valves include an apply valve 344 and a dump valve 346 in fluid communication with the conduit 324 for cooperatively supplying brake fluid received from the boost valves to the wheel brake 16a, and for cooperatively relieving pressurized brake fluid from the wheel brake 16a to the reservoir conduit 343. A third set of valves include an apply valve 348 and a dump valve 350 in fluid communication with the conduit 326 for cooperatively supplying brake fluid received from the boost valves to the wheel brake 16c, and for cooperatively relieving pressurized brake fluid from the wheel brake 16c to the reservoir conduit 343. A fourth set of valves include an apply valve 352 and a dump valve 354 in fluid communication with the conduit 326 for cooperatively supplying brake fluid received from the boost valves to the wheel brake 16d, and for cooperatively relieving pressurized brake fluid from the wheel brake 16d to the reservoir conduit 343.

As stated above, the system 10 includes a source of pressure in the form of the plunger assembly 300 to provide a desired pressure level to the wheel brakes 16a-d. The system 10 further includes a venting valve 302 and a pumping valve 304 which cooperate with the plunger assembly 300 to provide boost pressure to the boost conduit 260 for actuation of the wheel brakes 16a-d. The venting valve 302 and the pumping valve 304 may be solenoid actuated valves movable between open positions and closed positions. In the closed positions, the venting valve 302 and the pumping valve 304 may still permit flow in one direction as schematically shown as a check valve in FIG. 1. The venting valve 302 is in fluid communication with the reservoir conduit 296 and a first output conduit 306 in fluid communication with the plunger assembly 300. A second output conduit 308 is in fluid communication between the plunger assembly 300 and the boost conduit 260.

Figure 3:
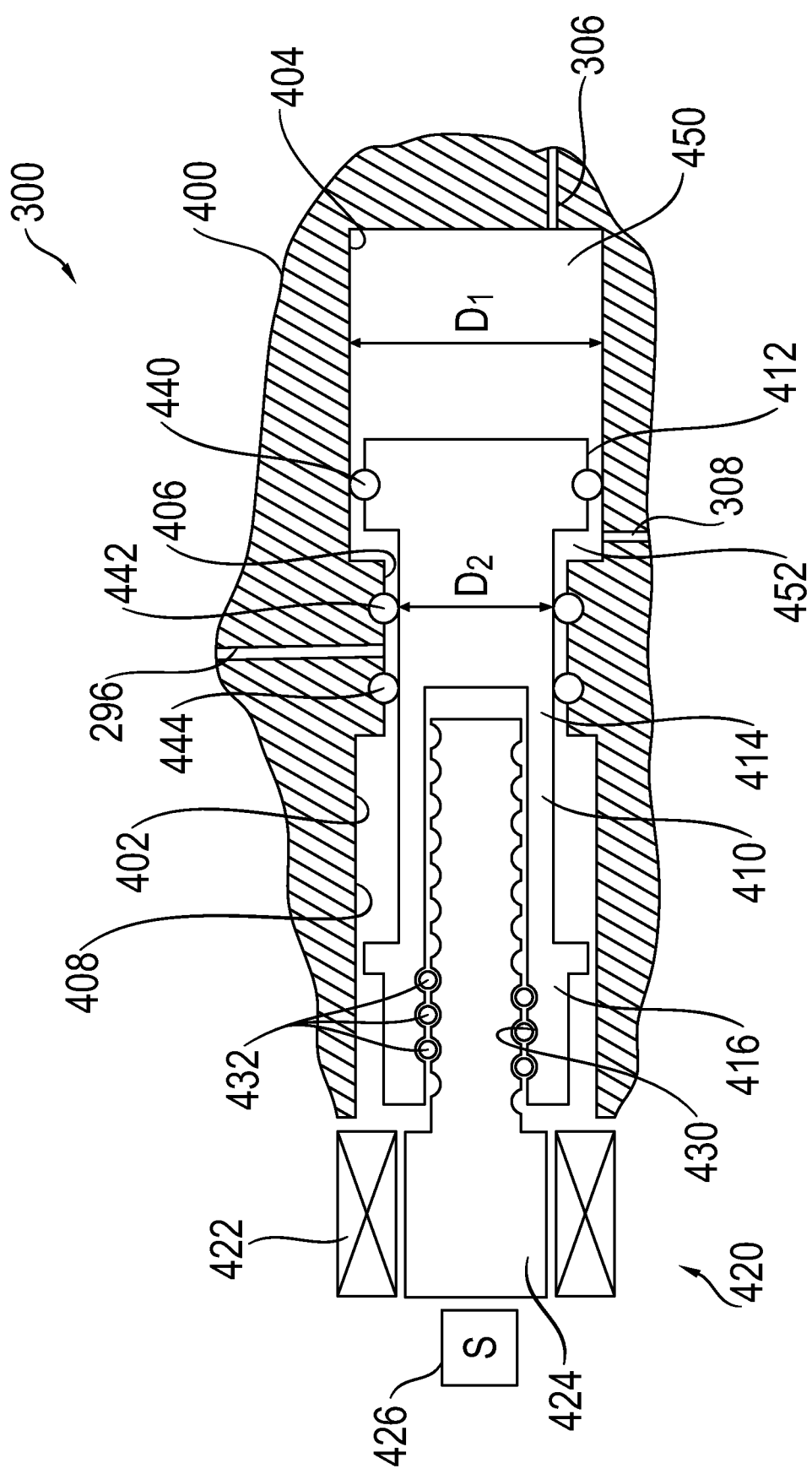
FIG. 3 is an enlarged schematic sectional view of the plunger assembly of the brake system of FIG. 1 shown in a rest position.

As best shown in FIG. 3, the plunger assembly 300 includes a housing 400 having a multi-stepped bore 402 formed therein. The bore 402 includes a first portion 404, a second portion 406, and third portion 408. A piston 410 is slidably disposed with the bore 402. The piston 410 includes an enlarged end portion 412 connected to a smaller diameter central portion 414. The piston 410 has a second end 416 connected to a ball screw mechanism, indicated generally at 420. The ball screw mechanism 420 is provided to impart translational or linear motion of the piston 410 along an axis defined by the bore 402 in both a forward direction (rightward as viewing FIGS. 1 and 3), and a rearward direction (leftward as viewing FIGS. 1 and 3) within the bore 402 of the housing 400. In the embodiment shown, the ball screw mechanism 420 includes a motor 422 rotatably driving a screw shaft 424. The motor 422 may include a sensor 426 for detecting the rotational position of the motor 422 and/or ball screw mechanism 420 which is indicative of the position of the piston 410. The second end 416 of the piston 410 includes a threaded bore 430 and functions as a driven nut of the ball screw mechanism 420. The ball screw mechanism 420 includes a plurality of balls 432 that are retained within helical raceways formed in the screw shaft 424 and the threaded bore 430 of the piston 410 to reduce friction. Although a ball screw mechanism 420 is shown and described with respect to the plunger assembly 300, it should be understood that other suitable mechanical linear actuators may be used for imparting movement of the piston 410. It should also be understood that although the piston 410 functions as the nut of the ball screw mechanism 420, the piston 410 could be configured to function as a screw shaft of the ball screw mechanism 420. Of course, under this circumstance, the screw shaft 424 would be configured to function as a nut having internal helical raceways formed therein.

As will be discussed in detail below, the plunger assembly 300 can provide boosted pressure to the boost conduit 260 when actuated in both the forward and rearward directions. The plunger assembly 300 includes a seal 440 mounted on the enlarged end portion 412 of the piston 410. The seal 440 slidably engages with the inner cylindrical surface of the first portion 404 of the bore 2 as the piston 410 moves within the bore 402. A pair of seals 442 and 444 is mounted in grooves formed in the second portion 406 of the bore 402. The seals 442 and 444 slidably engage with the outer cylindrical surface of the central portion 414 of the piston 410. A first pressure chamber 450 is generally defined by the first portion 404 of the bore 402, the enlarged end portion 412 of the piston 410, and the seal 440. A second pressure chamber 452, located generally behind the enlarged end portion 412 of the piston 410, is generally defined by the first and second portions 404 and 406 of the bore 402, the seals 442 and 444, and the central portion 414 of the piston 410. The seals 440, 442, and 44 can have any suitable seal structure. In one embodiment, the seal 440 is a quad ring seal. Although a lip seal may also be suitable for the seal 440, a lip seal is more generally more compliant and requires more volume displacement for a given pressure differential. This may result in a small boost pressure reduction when the piston 410 travels in the rearward direction during a pumping mode.

As stated above, the brake pedal unit assembly 12 includes a simulation valve 74 which may be mounted in the housing 24 or remotely from the housing 24. As schematically shown in FIGS. 1 and 2, the simulation valve 74 may be a solenoid actuated valve. The simulation valve 74 includes a first port 75 and a second port 77. The port 75 is in fluid communication with the conduit 146 which is in fluid communication with the simulation chamber 144. The port 77 is in fluid communication with the conduit 72 which is in fluid communication with the reservoir 18 via the conduits 66 and 68. The simulation valve 74 is movable between a first position 74a restricting the flow of fluid from the simulation chamber 144 to the reservoir 18, and a second position 74b permitting the flow of fluid between the reservoir 18 and the simulation chamber 144. The simulation valve 74 is in the first position or normally closed position when not actuated such that fluid is prevented from flowing out of the simulation chamber 144 through conduit 72, as will be explained in detail below.

The following is a description of the operation of the brake system 10. FIGS. 1 and 2 illustrate the brake system 10 and the brake pedal unit 20 in the rest position. In this condition, the driver is not depressing the brake pedal 42. Also in the rest condition, the simulation valve 74 may be energized or not energized. During a typical braking condition, the brake pedal 42 is depressed by the driver of the vehicle. The brake pedal 42 is coupled to the travel sensor 240 for producing a signal that is indicative of the length of travel of the input piston 34 and providing the signal to an electronic control module (not shown). The control module may include a microprocessor. The control module receives various signals, processes signals, and controls the operation of various electrical components of the brake system 10 in response to the received signals. The control module can be connected to various sensors such as pressure sensors, travel sensors, switches, wheel speed sensors, and steering angle sensors. The control module may also be connected to an external module (not shown) for receiving information related to yaw rate, lateral acceleration, longitudinal acceleration of the vehicle such as for controlling the brake system 10 during vehicle stability operation. Additionally, the control module may be connected to the instrument cluster for collecting and supplying information related to warning indicators such as ABS warning light, brake fluid level warning light, and traction control/vehicle stability control indicator light.

During normal braking operations (normal boost apply braking operation) the plunger assembly 300 is operated to provide boost pressure to the boost conduit 260 for actuation of the wheel brakes 16a-d. Under certain driving conditions, the control module communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). During a normal boost apply braking operation, the flow of pressurized fluid from the brake pedal unit 20 generated by depression of the brake pedal 42 is diverted into the internal pedal simulator assembly 100. The simulation valve 74 is actuated to divert fluid through the simulation valve 74 from the simulation chamber 144 to the reservoir 18 via the conduits 146, 72, 66, and 68. Note that fluid flow from the simulation chamber 144 to the reservoir 18 is closed off once the passageways 64 in the input piston 34 move past the seal 60. Prior to movement of the input piston 34, as shown in FIGS. 1 and 2, the simulation chamber 144 is in fluid communication with the reservoir 18 via the conduits 66 and 68.

During the duration of the normal braking mode, the simulation valve 74 remains open permitting the fluid to flow from the simulation chamber 144 to the reservoir 18. The fluid within the simulation chamber 144 is non-pressurized and is under very low pressures, such as atmospheric or low reservoir pressure. This non-pressurized configuration has an advantage of not subjecting the sealing surfaces of the pedal simulator to large frictional forces from seals acting against surfaces due to high pressure fluid. In conventional pedal simulators, the piston(s) are under increasingly high pressures as the brake pedal is depressed subjecting them large frictional forces from the seals, thereby adversely effecting the pedal feel.

Also during the normal boost apply braking operation, the isolation valves 320 and 322 are energized to a secondary position to prevent the flow of fluid from the conduits 156 and 166 through the valves 320 and 322. Fluid flow is prevented from flowing from the ports 320a and 322a to the ports 320c and 322c, respectively. Thus, the fluid within the first and second output pressure chambers 198 and 228 of the brake pressure unit 20 are fluidly locked which generally prevents the first and second output pistons 38 and 40 from moving further. More specifically, during the initial stage of the normal boost apply braking operation, movement of the input rod 45 causes movement of the input piston 34 in a rightward direction, as viewing FIG. 2. Initial movement of the input piston 34 causes movement of the primary piston 38 via the low rate simulator spring 108. Movement of the primary piston 38 causes initial movement of the secondary piston 40 due to the mechanical connection therebetween by the locking member 180 and the springs 188 and 190. Note that during this initial movement of the primary piston 38, fluid is free to flow from the primary pressure chamber 198 to the reservoir 18 via conduits 85, 154, and 68 until the conduit 85 moves past the seal 81. Also, during initial movement of the secondary piston 40, fluid is free to flow from the secondary pressure chamber 228 to the reservoir 18 via the conduits 155 and 164 until the conduit 155 moves past the seal 154.

After the primary and secondary pistons 38 and 40 stop moving (by closing of the conduits 85 and 155 and closing of the first and second base brake valves 320 and 322), the input piston 34 continues to move rightward, as viewing FIGS. 1 and 2, upon further movement by the driver depressing the brake pedal 42. Further movement of the input piston 34 compresses the various springs of the pedal simulator assembly 100, thereby providing a feedback force to the driver of the vehicle.

During normal braking operations (normal boost apply braking operation) while the pedal simulator assembly 100 is being actuated by depression of the brake pedal 42, the plunger assembly 300 can be actuated by the electronic control unit to provide actuation of the wheel brakes 16a-d. Actuation of the isolation valves 320 and 322 to their secondary positions to prevent the flow of fluid from the conduits 156 and 166 through the valves 320 and 322 isolates the brake pedal unit 20 from the wheel brakes 16a-d. The plunger assembly 300 may provide "boosted" or higher pressure levels to the wheel brakes 16a-d compared to the pressure generated by the brake pedal unit 20 by the driver depressing the brake pedal 42. Thus, the system 10 provides for assisted braking in which boosted pressure is supplied to the wheel brakes 16a-d during a normal boost apply braking operation helping reduce the force required by the driver acting on the brake pedal 42.

To actuate the wheel brakes 16a-d via the plunger assembly 300 when in its rest position, as shown in FIGS. 1 and 3, the electronic control unit energizes the venting valve 302 to its closed position, as shown in FIG. 1, such that fluid is prevented from venting to reservoir by flowing from the conduit 306 to the conduit 296. The pumping valve 304 is de-energized to its open position, as shown in FIG. 1, to permit flow of fluid through the pumping valve 304. The electronic control unit actuates the motor 422 in a first rotational direction to rotate the screw shaft 424 in the first rotational direction. Rotation of the screw shaft 424 in the first rotational direction causes the piston 410 to advance in the forward direction (rightward as viewing FIGS. 1 and 3).

Movement of the piston 410 causes a pressure increase in the first pressure chamber 450 and fluid to flow out of the first pressure chamber 450 and into the conduit 306. Fluid can flow into the boost conduit 260 via the open pumping valve 304. Note that fluid is permitted to flow into the second pressure chamber 452 via the conduit 308 as the piston 410 advances in the forward direction. Pressurized fluid from the boost conduit 260 is directed into the conduits 324 and 326 through the isolation valves 320 and 322. The pressurized fluid from the conduits 324 and 326 can be directed to the wheel brakes 16a-d through opened apply valves 340, 344, 348, and 352 while the dump valves 342, 346, 350, and 354 remain closed. When the driver releases the brake pedal 42, the pressurized fluid from the wheel brakes 16a-d may back drive the ball screw mechanism 420 moving the piston 410 back to its rest position. Under certain circumstances, it may also be desirable to actuate the motor 422 of the plunger assembly 300 to retract the piston 410 withdrawing the fluid from the wheel brakes 16a-d. During a forward stroke of the plunger assembly 300, the pumping valve 304 may be in its open position or held closed During a braking event, the electronic control module can also selectively actuate the apply valves 340, 344, 348, and 352 and the dump valves 342, 346, 350, and 354 to provide a desired pressure level to the wheel brakes 16d, 16a, 16c, and 16b, respectively.

In some situations, the piston 410 of the plunger assembly 300 may reach its full stroke length within the bore 402 of the housing 400 and additional boosted pressure is still desired to be delivered to the wheel brakes 16-d. The plunger assembly 300 is a dual acting plunger assembly such that it is configured to also provide boosted pressure to the boost conduit 260 when the piston 410 is stroked rearwardly. This has the advantage over a conventional plunger assembly that first requires its piston to be brought back to its rest or retracted position before it can again advance the piston to create pressure within a single pressure chamber. If the piston 410 has reached its full stroke, for example, and additional boosted pressure is still desired, the pumping valve 304 is energized to its closed check valve position. The venting valve 302 may be de-energized to its open position. Alternatively, the venting valve 302 may be left energized in its closed to permit fluid flow through its check valve during a pumping mode. The electronic control unit actuates the motor 422 in a second rotational direction opposite the first rotational direction to rotate the screw shaft 424 in the second rotational direction. Rotation of the screw shaft 424 in the second rotational direction causes the piston 410 to retract or move in the rearward direction (leftward as viewing FIGS. 1 and 3). Movement of the piston 410 causes a pressure increase in the second pressure chamber 452 and fluid to flow out of the second pressure chamber 452 and into the conduit 308. Note that fluid is permitted to flow into the first pressure chamber 450 via the conduits 306 and 296 as the piston 410 moves rearwardly or in its return stroke. Pressurized fluid from the boost conduit 260 is directed into the conduits 324 and 326 through the isolation valves 320 and 322. The pressurized fluid from the conduits 324 and 326 can be directed to the wheel brakes 16a-d through the opened apply valves 340, 344, 348, and 352 while dump valves 342, 346, 350, and 354 remain closed. In a similar manner as during a forward stroke of the piston 410, the electronic control module can also selectively actuate the apply valves 340, 344, 348, and 352 and the dump valves 342, 346, 350, and 354 to provide a desired pressure level to the wheel brakes 16d, 16a, 16c, and 16b, respectively.

As shown in FIG. 3, the first portion 404 of the bore 402 generally has a fluid diameter $D_1$ corresponding to where the outer diameter of the seal 440 slides along the inner cylindrical surface of the first portion 404 of the bore 402. The second portion 406 of the bore 402 generally has a fluid diameter $D_2$ corresponding to inner diameter of the seal 442 sliding against the outer diameter of the central portion 414 of the piston 410. The first pressure chamber 450 generally has an effective hydraulic area corresponding to the diameter $D_2$ since fluid is diverted through the conduits 306, 260, and 308 as the piston 410 is advanced in the forward direction. The second pressure chamber 452 has an effective hydraulic area corresponding to the diameter $D_1$ minus the diameter $D_2$. The plunger assembly 300 can be configured to have any suitable dimensions for the diameters $D_1$ and $D_2$. In one embodiment, the diameters $D_1$ and $D_2$ can be configured such that the effective area defined by $D_1$ can be greater than the annular effective area defined by $D_1$ and $D_2$. This configuration provides that on the back stroke in which the piston is moving rearwardly, less torque (or power) is required by the motor 422 to maintain the same pressure as in its forward stroke. Besides using less power, the motor 422 may also generate less heat during the rearward stroke of piston 410. Under circumstances in which the driver presses on the pedal 42 for long durations, the plunger assembly 300 could be operated to apply a rearward stroke of the piston 410 to prevent overheating of the motor 422. Note that the chamber 450 should be sized larger than the chamber 452.

Instead of using the apply valves 340, 344, 348, and 352 and the dump valves 342, 346, 350, and 354 to provide a desired pressure level to the wheel brakes 16d, 16a, 16c, and 16b, the system 10 could replace the apply and dump valves with single control valves (not shown) in the conduits corresponding to the wheel brakes 16a-d. The control valves can be actuated individually, in a multiplexing manner, between their open and closed positions to provide different braking pressures within the wheel brakes 16a-d. This may be used during various braking functions such as anti-lock braking, traction control, dynamic rear proportioning, vehicle stability control, hill hold, and regenerative braking Pressurized fluid is returned from the wheel brakes 16a-d to the plunger assembly 300 through the control valves instead of being diverted to the reservoir. In this situation, the plunger assembly 300 is preferably configured and operated by the electronic control unit (not shown) such that relatively small rotational increments of the motor 422 and/or ball screw mechanism 420 are obtainable. Thus, small volumes of fluid and relatively minute pressure levels are able to be applied and removed from the conduits associated with the wheel brakes 16a-d. For example, the motor 422 may be actuated to turn 0.5 of a degree to provide a relatively small amount of fluid and pressure increase. This enables a multiplexing arrangement such that the plunger assembly 300 can be controlled to provide individual wheel pressure control. Thus, the plunger assembly 300 and the system 10 can be operated to provide individual control for the wheel brakes 16a-d or can be used to control one or more wheel brakes 16a-d simultaneously by opening and closing the appropriate control valves (not shown).

In the event of a loss of electrical power to portions of the brake system 10, the brake system 10 provides for manual push through or manual apply such that the brake pedal unit 20 can supply relatively high pressure fluid to the primary output conduit 156 and the secondary output conduit 166. During an electrical failure, the motor 422 of the plunger assembly 300 might cease to operate, thereby failing to produce pressurized hydraulic brake fluid from the plunger assembly 300. The isolation valves 320 and 324 will shuttle (or remain) in their positions to permit fluid flow from the conduits 156 and 166 to the wheel brakes 16a-d. The simulation valve 74 is shuttled to its closed position 74a, as shown in FIGS. 1 and 2, to prevent fluid from flowing out of the simulation chamber 144 to the reservoir 18. Thus, moving the simulation valve 74 to its closed position 74a hydraulically locks the simulation chamber 144 trapping fluid therein. During the manual push-through apply, the primary and secondary output pistons 38 and 40 will advance rightward pressurizing the chambers 198 and 228, respectively. Fluid flows from the chambers 198 and 228 into the conduits 156 and 166, respectively, to actuate the wheel brakes 16a-d as described above.

During the manual push-through apply, initial movement of the input piston 34 forces the spring(s) of the pedal simulator to start moving the pistons 38 and 40. After further movement of the input piston 34, in which the fluid within the simulation chamber 144 is trapped or hydraulically locked, further movement of the input piston 34 pressurizes the simulation chamber 144 causing movement of the primary piston 38 which also causes movement of the secondary piston 40 due to pressurizing of the primary chamber 144. As shown in FIGS. 1 and 2, the input piston 34 has a smaller diameter (about the seal 60) than the diameter of the primary piston 38 (about the seal 80). Since the hydraulic effective area of the input piston 34 is less than the hydraulic effective area of the primary piston 38, the input piston 34 may travel more axially in the right-hand direction as viewing FIGS. 1 and 2 than the primary piston 38. An advantage of this configuration is that although a reduced diameter effective area of the input piston 34 compared to the larger diameter effective area of the primary piston 38 requires further travel, the force input by the driver's foot is reduced. Thus, less force is required by the driver acting on the brake pedal 42 to pressurize the wheel brakes compared to a system in which the input piston and the primary piston have equal diameters.

In another example of a failed condition of the brake system 10, the hydraulic control unit 12 may fail as discussed above and furthermore one of the output pressure chambers 198 and 228 may be reduced to zero or reservoir pressure, such as failure of a seal or a leak in one of the conduits 156 or 166. The mechanical connection of the primary and secondary pistons 38 and 40 prevents a large gap or distance between the pistons 38 and 40 and prevents having to advance the pistons 38 and 40 over a relatively large distance without any increase in pressure in the non-failed circuit. For example, if the brake system 10 is under a manual push through mode and additionally fluid pressure is lost in the output circuit relative to the secondary piston 40, such as for example in the conduit 166, the secondary piston 40 will be forced or biased in the rightward direction due to the pressure within the primary chamber 198. If the primary and secondary pistons 38 and 40 were not connected together, the secondary piston 40 would freely travel to its further most right-hand position, as viewing FIGS. 1 and 2, and the driver would have to depress the pedal 42 a distance to compensate for this loss in travel. However, because the primary and secondary pistons 38 and 40 are connected together through the locking member 180, the secondary piston 40 is prevented from this movement and relatively little loss of travel occurs in this type of failure. Thus, the maximum volume of the primary pressure chamber 198 is limited had the secondary piston 40 not be connected to the primary piston 38.

In another example, if the brake system 10 is under a manual push through mode and additionally fluid pressure is lost in the output circuit relative to the primary piston 40, such as for example, in the conduit 156, the secondary piston 40 will be forced or biased in the leftward direction due to the pressure within the secondary chamber 228. Due to the configuration of the brake pedal unit 20, the left-hand end of the secondary piston 40 is relatively close to the right-hand end of the primary piston 38. Thus, movement of the secondary piston 40 towards the primary piston 38 during this loss of pressure is reduced compared to a conventional master cylinder in which the primary and secondary pistons have equal diameters and are slidably disposed in the same diameter bore. To accomplish this advantage, the housing 24 of the brake pedal unit 20 includes a stepped bore arrangement such that diameter of the second bore 28 which houses the primary piston 38 is larger than the third bore 30 housing the secondary piston 40. A portion of the primary chamber 198 includes an annular region surrounding a left-hand portion of the secondary piston 40 such that the primary and secondary pistons 38 and 40 can remain relatively close to one another during a manual push-through operation. In the configuration shown, the primary and secondary pistons 38 and 40 travel together during a manual push-through operation in which both of the circuits corresponding to the conduits 156 and 166 are intact. This same travel speed is due to the hydraulic effective areas of the pistons 38 and 40, for their respective output pressure chambers 198 and 228, are approximately equal. In a preferred embodiment, the area of the diameter of the secondary piston 40 is approximately equal to the area of the diameter of the primary piston 38 minus the area of the diameter of the secondary piston 40. Of course, the brake pedal unit 20 could be configured differently such that the primary and secondary pistons 38 and 40 travel at different speeds and distances during a manual push though operation.

During a manual push-through operation in which both of the circuits corresponding to the conduits 156 and 166 are intact, such as during an electrical failure described above, the combined hydraulic effective area of the primary and secondary pistons 38 and 40 is the area of the diameter of the primary piston 38. However, during a failure of one of the circuits corresponding to the conduits 156 and 166, such as by a leak in the conduit 166, the hydraulic effective area is halved such that the driver can now generate double the pressure within the primary chamber 198 and the non-failed conduit 156 when advancing the primary piston 38 during a manual push-through operation via depression of the brake pedal 42. Thus, even though the driver is actuating only two of the wheel brakes 16a and 16d during this manual push through operation, a greater pressure is obtainable in the non-failed primary chamber 198. Of course, the stroke length of the primary piston 38 will need to be increased to compensate.

Figure 4:
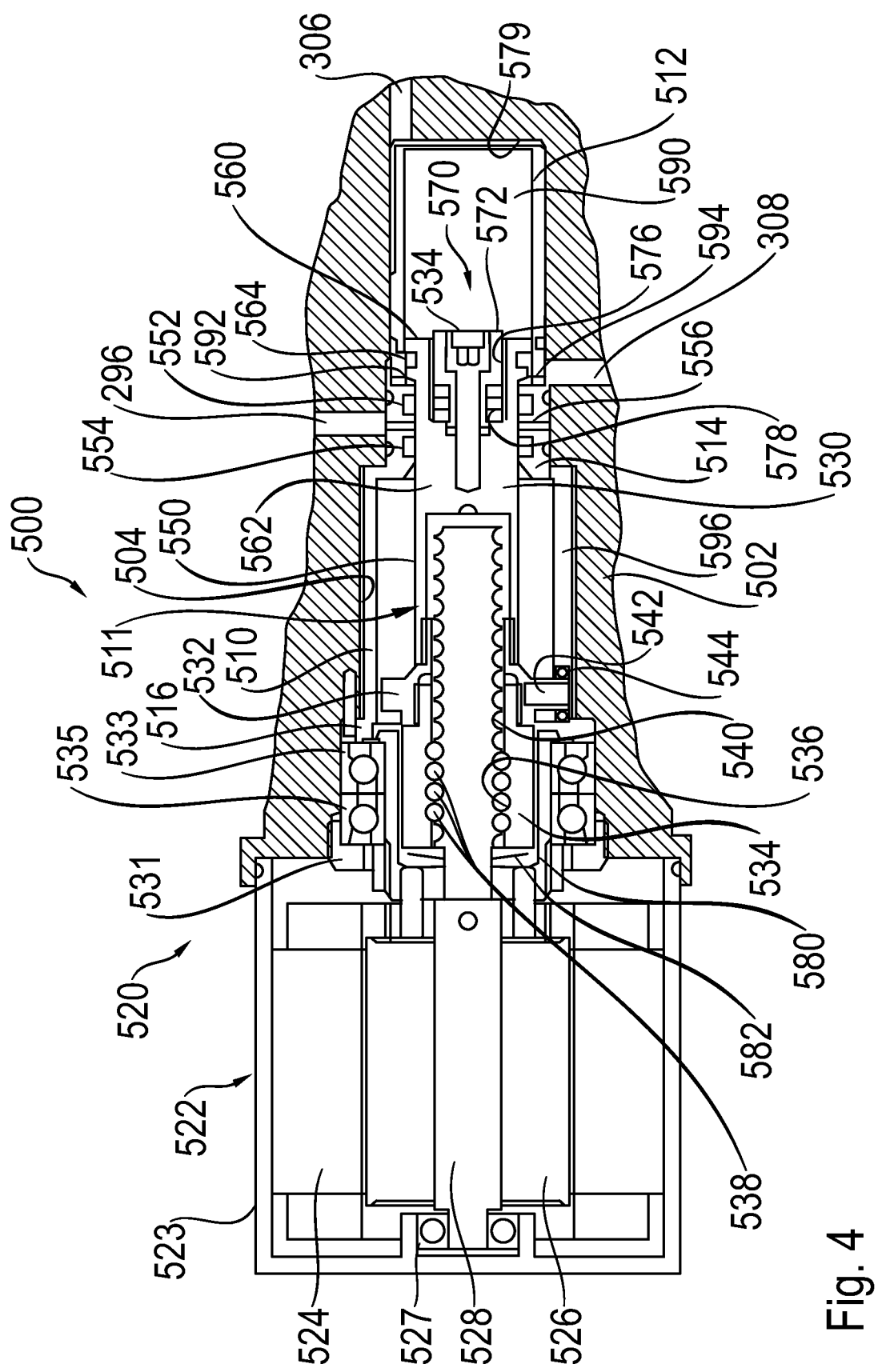
FIG. 4 is an alternate embodiment of a plunger assembly which may be used in the brake system of FIG. 1.

There is illustrated in FIG. 4 an alternate embodiment of a plunger assembly, indicated generally at 500, which may be used for the plunger assembly 300 in the brake system 10, for example. The plunger assembly 500 includes a housing 502 having a multi-stepped bore 504 formed therein. If installed into the system 10, the conduits 296, 306, and 308 are in fluid communication with the bore 504. A hollow sleeve 510 may be inserted into the bore 504. Although the components of the plunger assembly 500 may be made of any suitable material, the housing 502 may be made of aluminum for weight reduction while the sleeve 510 may be made of a hard coat anodized metal for accepting a piston assembly 511 slidably disposed therein. The sleeve 510 has a multi-stepped inner bore including a first portion 512, a second portion 514, and a third portion 516 (similar to the first portion 404, the second portion 406, and the third portion 408 of the bore 402 of the plunger assembly 300).

The plunger assembly 500 further includes a ball screw mechanism, indicated generally at 520. The ball screw mechanism 520 includes a motor 522 having an outer housing 523 which houses a stator 524 for rotating a rotor 526. The rotor 526 rotates a screw shaft 528 extending along the axis of the plunger assembly 500. A rear end of the rotor 526 is supported in the housing 523 by a bearing assembly 527. The front end of the rotor 526 is connected to a multi-piece support assembly 531 which is supported by a pair of bearing assemblies 533 and 535 mounted in the bore 504 of the housing 502. The bearing assemblies 527, 533, and 535 are shown as ball bearing assemblies having upper and lower races. However, it should be understood that the bearings assemblies 531, 533, and 535 can be any suitable structure.

The piston assembly 511 includes a piston 530 threadably attached to an intermediate connector 532 which is threadably attached to a nut 534. The nut 534 includes an internal threaded bore 536 having helical raceways formed therein for retaining a plurality of balls 538. The balls 538 are also retained in raceways 540 formed in the outer surface of the screw shaft 528, thereby functioning as a ball screw drive mechanism. To prevent rotation of the piston assembly 511, the plunger 500 can include an anti-rotation device including a pin 542 extending radially outwardly from the intermediate connector 532. A bearing assembly 544 is attached to the pin 542 and rolls along a slot 546 formed in the third portion 516 of the sleeve 510. Of course, any suitable anti-rotation device may be used. Also, although a single anti-rotation device is shown and described, the plunger assembly 500 can have one or more, such as for example, a pair of anti-rotation devices arranged 180 degrees apart from one another.

The piston 530 of the piston assembly 511 includes an outer cylindrical surface 550 which sealing engages with a pair of lip seals 552 and 554 mounted in grooves formed in the sleeve 510. Radial passageways 556 are formed through the sleeve 510 which are in fluid communication with the reservoir conduit 296. The piston 530 includes an enlarged end portion 560 and a smaller diameter central portion 562. A seal, such as quad seal 564 is mounted in a groove formed in the enlarged end portion 560 of the piston 530. The seals 552, 554, and 564 function similarly to the seals 442, 444, and 440 of the plunger assembly 300 described above.

The piston 530 of the piston assembly 511 may optionally include a stop cushion assembly, indicated generally at 570. The stop cushion assembly 570 includes end member 572 connected to the end of the piston 530 by a bolt 574 or other fastener. The end member 572 is disposed in a recess 576 formed in the piston 530 and is mounted by the bolt 574 such that the end member 572 may move a limited amount relative to the piston 530. A spring member, such as a plurality of disc springs 578 (or Belleville washer or spring washers) bias the end member 572 in a direction away from the piston 530. The right-hand most end of the end member 572, as viewing FIG. 4, extends past the end of the piston 530. The stop cushion assembly 570 provides for a cushioned stop if the end of the piston 530 engages with a bottom wall 579 of the bore 504 by compression of the springs 578.

The piston assembly 511 may also include an optional rear stop cushion assembly, indicated generally at 580. The rear stop cushion assembly 580 includes a disc spring 582 disposed about the screw shaft 528 and engages with the end wall of the nut 534 of the piston assembly 511. The disc spring 582 may slightly compress when the piston assembly 511 is moved back its fully rested position.

A first pressure chamber 590 is generally defined by the sleeve 510, the bore 504, the enlarged end portion 560 of the piston 530, and the seal 564. A second pressure chamber 592, located generally behind the enlarged end portion 560 of the piston 530, is generally defined by the sleeve 510, the bore 504, the seals 552 and 564, and the piston 530. Passageways 594 are formed through the sleeve 510 and are in fluid communication with the second pressure chamber 592 and the conduit 308.

The piston assembly 500 operates in a similar manner as the plunger assembly 300 and will be described as being used in the system 10. For example, to actuate the wheel brakes 16a-d when the plunger assembly 500 is in its rest position, as shown in FIG. 4, the electronic control unit actuates the motor 522 in a first rotational direction to rotate the screw shaft 528 in the first rotational direction. Rotation of the screw shaft 528 in the first rotational direction causes the piston assembly 511 to advance in the forward direction (rightward as viewing FIGS. 1 and 3). Movement of the piston assembly 511 causes a pressure increase in the first pressure chamber 590 and fluid to flow out of the first pressure chamber 590 and into the conduit 306. Fluid can flow into the boost conduit 260 via the open pumping valve 304 or the check valve if the pumping valve 304 was in its closed position. Note that fluid is permitted to flow into the second pressure chamber 592 via the conduit 308 as the piston assembly 511 advances in the forward direction. Pressurized fluid from the boost conduit 260 is directed into the conduits 324 and 326 through the isolation valves 320 and 322. The pressurized fluid from the conduits 324 and 326 can be directed to the wheel brakes 16a-d through opened apply valves 340, 344, 348, and 352 while the dump valves 342, 346, 350, and 354 remain closed. When the driver releases the brake pedal 42, the pressurized fluid from the wheel brakes 16a-d may back drive the ball screw mechanism 420 moving the piston 410 back towards its rest position.

The plunger assembly 500 is a dual acting plunger assembly such that it is configured to also provide boosted pressure to the boost conduit 260 when the piston assembly 511 is stroked rearwardly. The electronic control unit actuates the motor 522 in a second rotational direction opposite the first rotational direction to rotate the screw shaft 528 in the second rotational direction. Rotation of the screw shaft 528 in the second rotational direction causes the piston assembly 511 to retract or move in the rearward direction (leftward as viewing FIGS. 1 and 3). Movement of the piston 530 causes a pressure increase in the second pressure chamber 592 and fluid to flow out of the second pressure chamber 592 and into the conduit 308. Pressurized fluid from the boost conduit 260 is directed into the conduits 324 and 326 through the isolation valves 320 and 322. The pressurized fluid from the conduits 324 and 326 can be directed to the wheel brakes 16a-d through the opened apply valves 340, 344, 348, and 352 while dump valves 342, 346, 350, and 354 remain closed. The pumping valve may be closed such that low pressure fluid fills the first pressure chamber 590.

Figure 5:
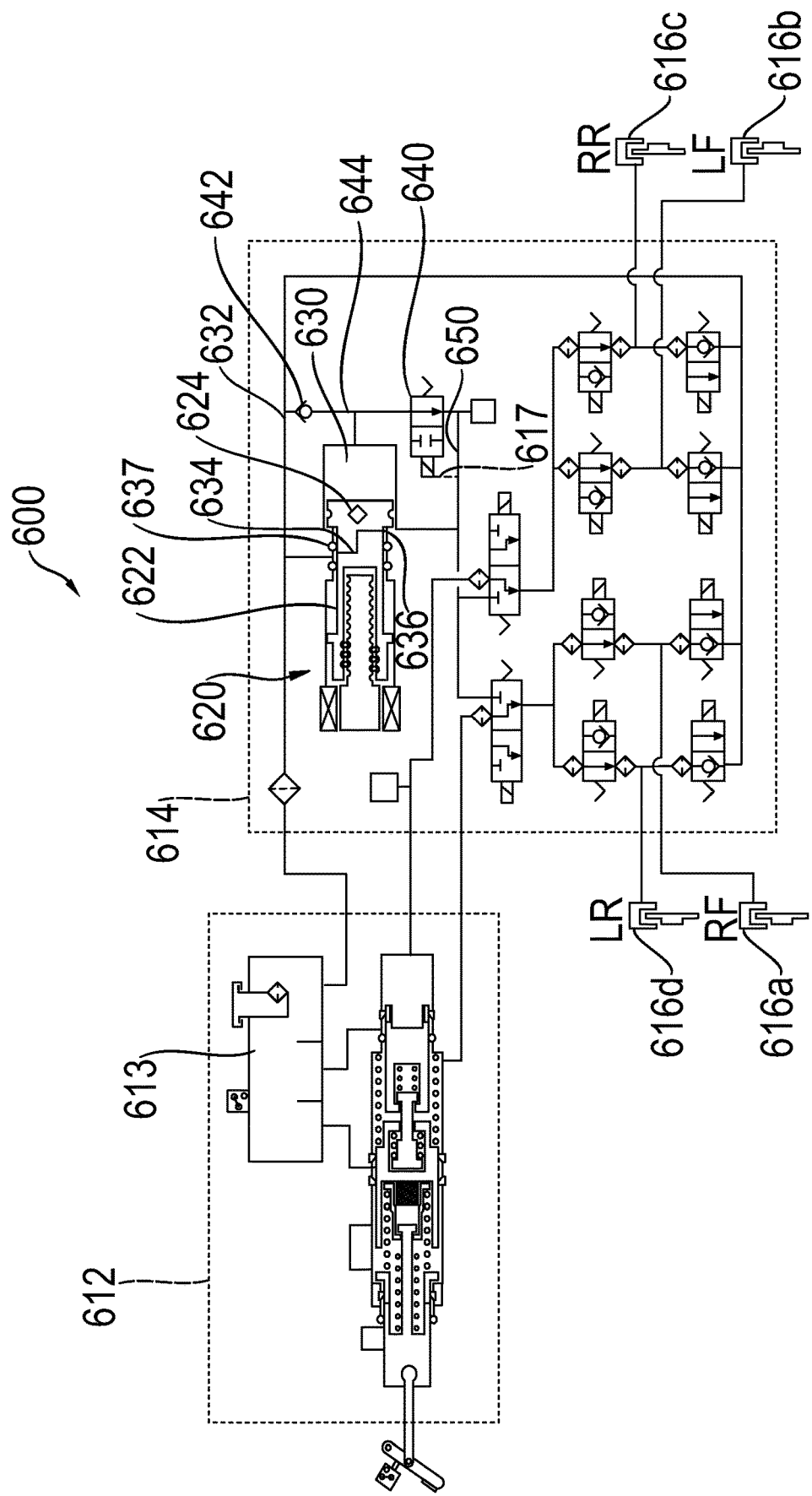
FIG. 5 is a schematic illustration of a second embodiment of a brake system.

There is illustrated in FIG. 5 a schematic illustration of a second embodiment of a brake system, indicated generally at 600. The brake system 600 is similar to the brake system 10 of FIG. 1 and, therefore, like functions and structures will not be described. Similar to the brake system 10, the brake system 600 includes a brake pedal unit 612, a hydraulic control unit 614, and wheel brakes 616a-d.

The brake system 600 does not include a venting valve like the venting valve 302 of the system 10. Instead, the brake system 600 includes a plunger assembly 620 similar to the plunger assembly 300. One of the differences is that the plunger assembly 620 has a piston 622 with a check valve 624 mounted therein. The check valve 624 permits fluid to flow from a first pressure chamber 630 to a reservoir conduit 632 (in communication with a reservoir 613) via a conduit 634 within the piston 622. It is noted that the check valve 624 prevents the flow of fluid from the reservoir 613 to the first pressure chamber 630 via the conduit 634. The check valve 624 also prevents the flow of fluid though the piston 622 from a second pressure chamber 636 to the first pressure chamber 630.

The system 600 includes a pumping valve 640 and a check valve 642. The check valve 642 is located within a conduit 644. The check valve 642 restricts the flow of fluid from the first pressure chamber 630 to the reservoir 613, while permitting the flow of fluid from the reservoir 613 to the pumping valve 640 and first pressure chamber 630. The pumping valve 640 is movable between an open position to permit the flow of fluid out of the first pressure chamber 630 and to a boost conduit 650 for delivering pressurized fluid to the wheel brakes 616*a-d*.

When the piston 622 advances in the forward direction, rightward as viewing FIG. 5, fluid flows out of the first pressure chamber 630 and through the de-energized pumping valve 640 into the boost conduit 650. Note that fluid is permitted to flow into the second pressure chamber 636. In the reverse stroke of the piston 622, the pumping valve 650 is energized to a closed position and fluid flows out of the second pressure chamber 636 but is prevented from flowing past the check valve 624 into the first pressure chamber 630. Note that in a reverse stroke, the piston 622 will have been moved rightward as viewing FIG. 5 such that the conduit 634 is to the right of a lip seal 637 to prevent fluid flow into the reservoir 613 from the second pressure chamber 636 via the conduit 634.

One of the advantages of the brake system 600 is a reduced cost due to not having to have a solenoid actuated venting valve. Additionally, there may not be a need to maintain power to the motor of the plunger assembly 620 on every brake apply. Another advantage is that the pumping valve only requires a small, low force, low cost, low current draw solenoid since it may hydraulically latch in a closed position as indicated by the dotted line 617 in FIG. 5. Under certain situations, the system 10 may need to be controlled to de-latch the valve 640.

Figure 6:
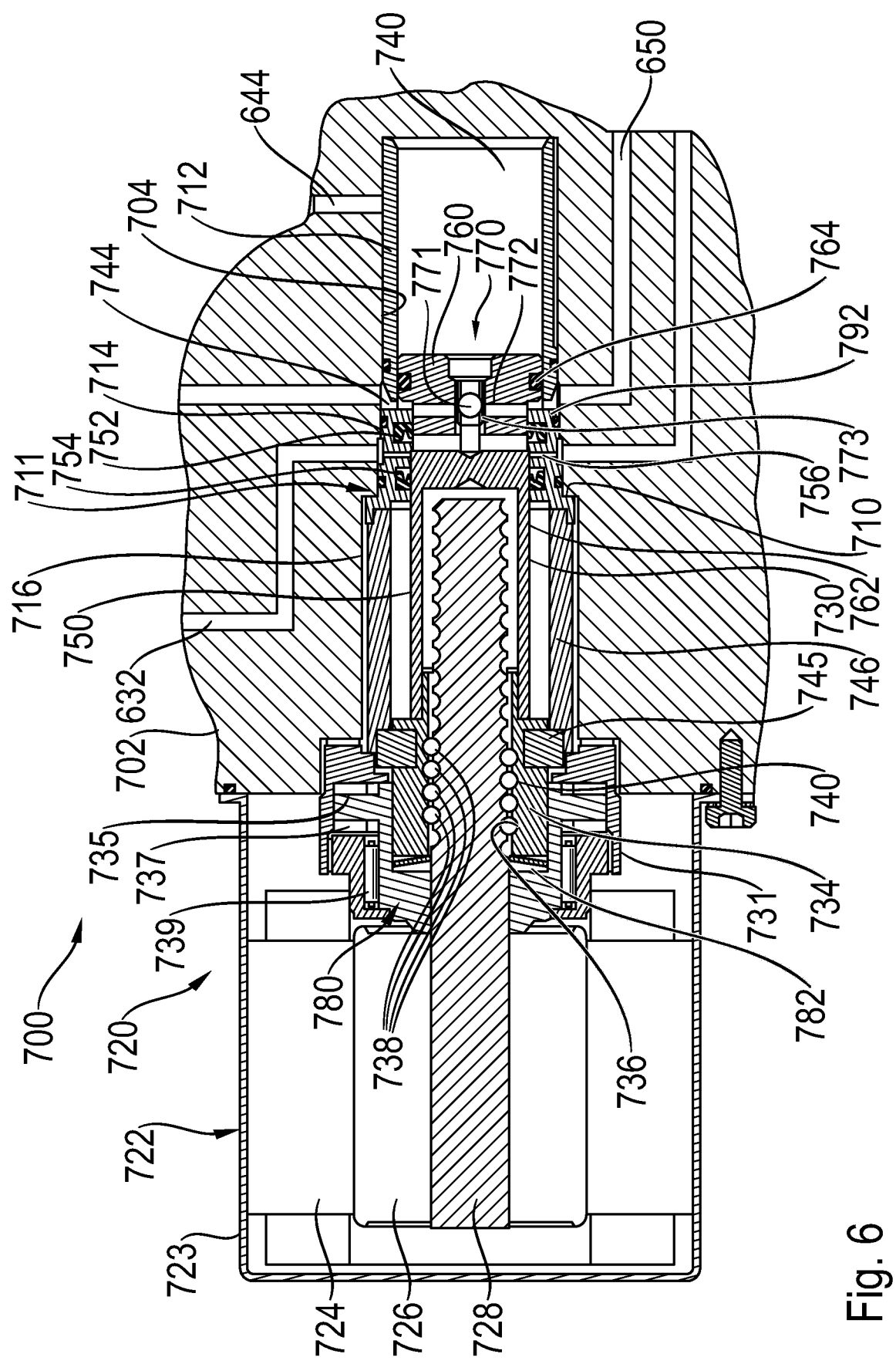
FIG. 6 is an alternate embodiment of a plunger assembly which may be used in the brake system of FIG. 5.

There is illustrated in FIG. 6 an alternate embodiment of a plunger assembly, indicated generally at 700, which may be used for the plunger assembly 620 in the brake system 600, for example. The plunger assembly 700 includes a housing 702 having a multi-stepped bore 704 formed therein. If installed into the system 600, the conduits 632, 644, and 650 are in fluid communication with the bore 704. A hollow sleeve 710 may be inserted into the bore 504. Although the components of the plunger assembly 700 may be made of any suitable material, the housing 702 may be made of aluminum for weight reduction while the sleeve 710 may be made of a hard coat anodized metal for accepting a piston assembly 711 slidably disposed therein. The sleeve 710 has a multi-stepped inner bore including a first portion 712 and a second portion 714. Instead of a third portion, a tube 716 is press fit or slip fit onto the end of the second portion 714. The tube 716 may be made of an inexpensive material, such as extruded aluminum, instead of utilizing an expensive portion of the sleeve 710.

The plunger assembly 700 further includes a ball screw mechanism, indicated generally at 720. The ball screw mechanism 720 includes a motor 722 having an outer housing 723 which houses a stator 724 for rotating a rotor 726. The rotor 726 rotates a screw shaft 728 extending along the axis of the plunger assembly 700. The front end of the rotor 526 is connected to a multi-piece support assembly 731 which is supported by generally inexpensive needle bearings (compared to more expensive roller angular contact ball bearings as shown in FIG. 4). In particular, the plunger assembly 700 includes a pair of thrust needle bearings 735 and 737 and a radial needle bearing 739. The bearings engage with features of the support assembly 731.

The piston assembly 711 includes a piston 730 threadably attached to a nut 734. The nut 734 includes an internal threaded bore 736 having helical raceways formed therein for retaining a plurality of balls 738. The balls 738 are also retained in raceways 740 formed in the outer surface of the screw shaft 728, thereby functioning as a ball screw drive mechanism. To prevent rotation of the piston assembly 711, the plunger 700 can include an anti-rotation device including one or more bushings 745 that slide within corresponding slots 746 formed in the tube 716. Of course, any suitable anti-rotation device may be used.

The piston 730 of the piston assembly 711 includes an outer cylindrical surface 750 which sealing engages with a pair of seals 752 and 754 mounted in grooves formed in the sleeve 710. Radial passageways 756 are formed through the sleeve 710 which are in fluid communication with the reservoir conduit 632. The piston 730 includes an enlarged end portion 760 and a smaller diameter central portion 762. A seal, such as quad seal 764 is mounted in a groove formed in the enlarged end portion 760 of the piston 730.

The plunger assembly 700 may include a check valve assembly 770 located in the enlarged end portion 760 of the piston 730. The check valve 770 is similar in function to the check valve 624 of the system 600. The check valve assembly 770 includes a ball 771 selectively seated on a valve seat 772 fixed relative to the piston 730. A generally small or weak spring 773 biases the ball 771 onto the valve seat 772.

The piston assembly 711 may also include an optional rear stop cushion assembly, indicated generally at 780. The rear stop cushion assembly 780 includes one or more disc spring 782 disposed about the screw shaft 728 and engaged with the end wall of the nut 734 of the piston assembly 711. The disc springs 782 may slightly compress when the piston assembly 711 is moved back its fully rested position.

A first pressure chamber 790 is generally defined by the sleeve 710, the bore 704, the enlarged end portion 760 of the piston 730, and the seal 764. A second pressure chamber 792, located generally behind the enlarged end portion 760 of the piston 730, is generally defined by the sleeve 710, the bore 704, the seals 752 and 764, and the piston 730. Passageways 794 are formed through the sleeve 710 and are in fluid communication with the second pressure chamber 792 and the conduit 650.

Figure 7:
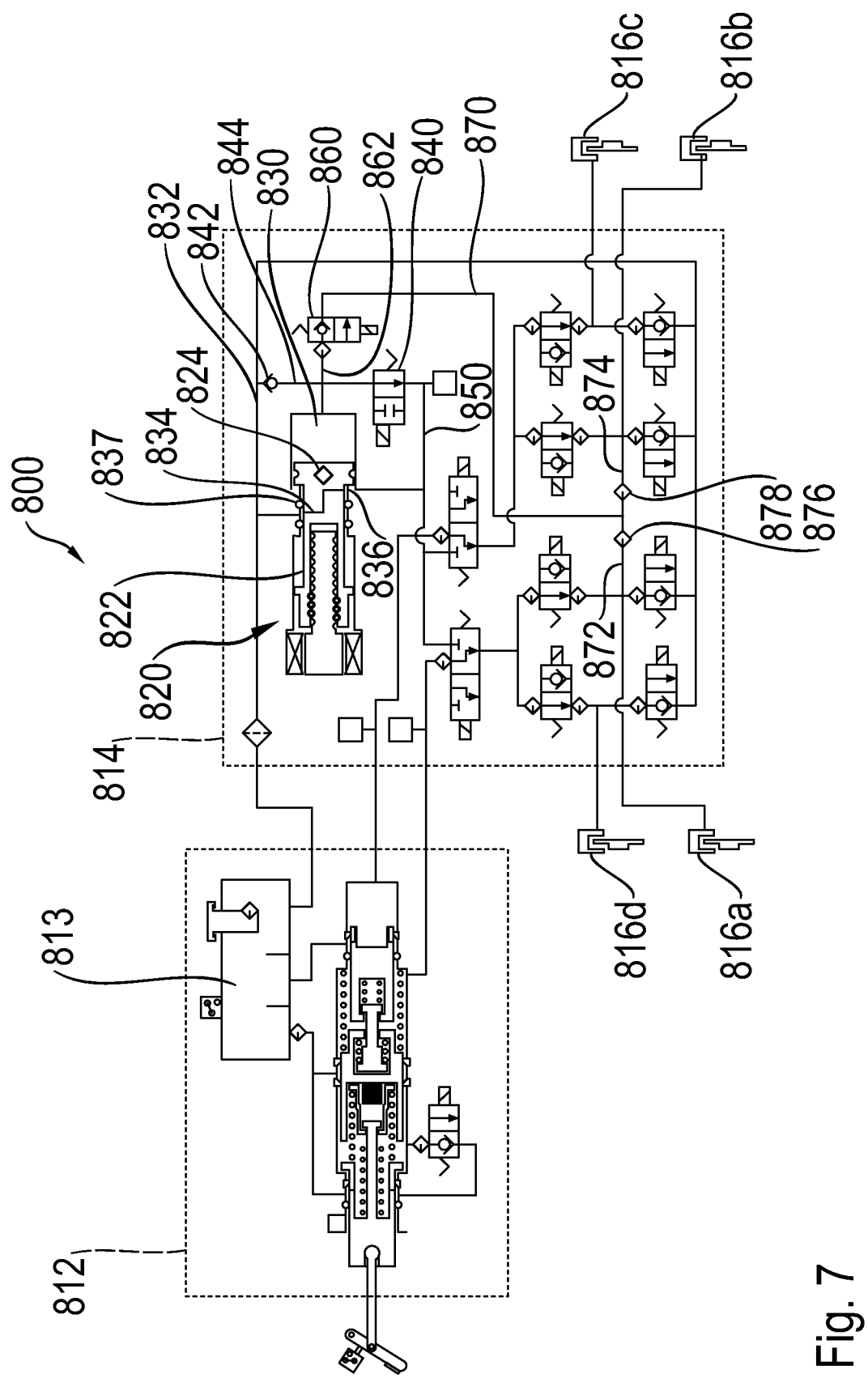
FIG. 7 is a schematic illustration of a third embodiment of a brake system.

There is illustrated in FIG. 7 a schematic illustration of a third embodiment of a brake system, indicated generally at 800. The brake system 800 is similar to the brake system 600 and, therefore, like functions and structures will not be described. The brake system 10 is ideally suited for large passenger vehicles or trucks. Generally, larger vehicles require more braking power and more fluid volume than brake systems for smaller vehicles. This generally requires a larger consumption of power for the motor for the plunger assembly.

The brake system 800 includes a brake pedal unit 812, a hydraulic control unit 814, and wheel brakes 816*a-d*. The brake assembly 800 further includes a plunger assembly 820 having a piston 822 with a check valve 824 mounted therein. The check valve 824 permits fluid to flow from a first pressure chamber 830 to a reservoir conduit 832 (in communication with a reservoir 813) via a conduit 834 within the piston 822. The check valve 824 prevents the flow of fluid from the reservoir 813 to the first pressure chamber 830 via the conduit 834. The check valve 824 also prevents the flow of fluid though the piston 882 from a second pressure chamber 836 to the first pressure chamber 830. The system 800 includes a pumping valve 840 and a check valve 842. The check valve 842 is located within a conduit 844. The check valve 842 restricts the flow of fluid from the first pressure chamber 830 to the reservoir 813, while permitting the flow of fluid from the reservoir 813 to the pumping valve 840 and first pressure chamber 830. The pumping valve 840 is movable between an open position to permit the flow of fluid out of the first pressure chamber 830 and to a boost conduit 850 for delivering pressurized fluid to the wheel brakes 816*a-d*.

Comparing the systems 600 and 800, the system 800 additionally includes a solenoid actuated quick fill valve 860. The quick fill valve 860 is in fluid communication with the second pressure chamber 830 via a conduit 862. The quick fill valve 800 is also in fluid communication with the wheel brakes 816*a* and 816*b* (such as front wheel brakes) via conduit 870, 872, and 874. The conduits 872 and 874 have check valves 876 and 878, respectively, located therein to prevent fluid from the wheel brakes flowing back into the conduit 870. The quick fill valve 860 may have relatively large orifices that enable fluid to easily flow through the quick fill valve 860 when in its energized to its open position, such as when the plunger assembly 820 is actuated to deliver high pressure fluid to the first pressure chamber 830. Since a lot of power may be required to force fluid through relatively small orifices in various valves and components of the system 800, the addition of the quick fill valve 820 helps to reduce power consumption. This is especially useful for larger vehicles when the amount of fluid flow is increased compared to smaller vehicles. The quick fill valve 860 may be left energized under normal boosted braking applications. During other events, such as anti-lock braking or slip control, the quick fill valve 820 may be moved to its closed position.

Figure 8:
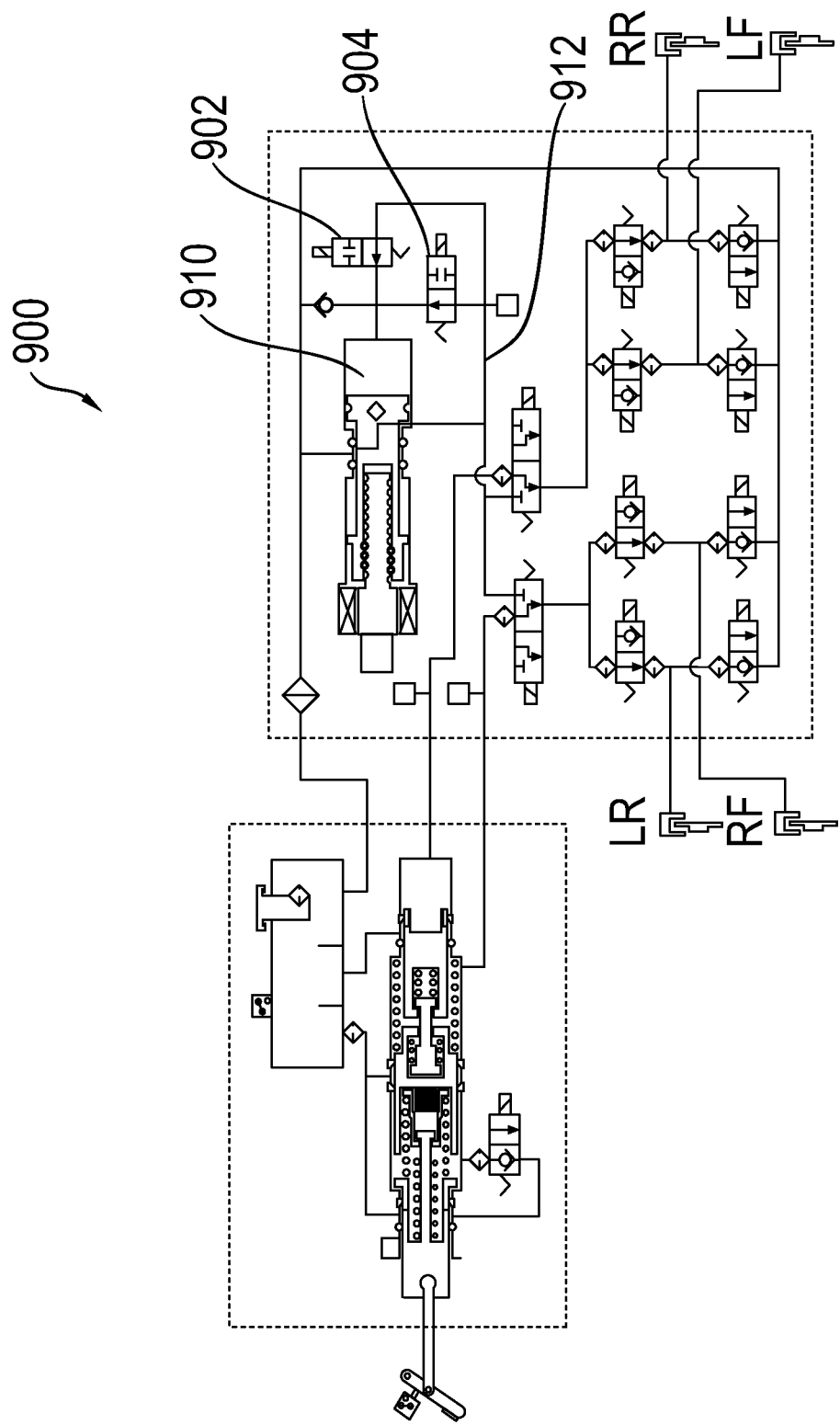
FIG. 8 is a schematic illustration of a fourth embodiment of a brake system.

There is illustrated in FIG. 8 a schematic illustration of a fourth embodiment of a brake system, indicated generally at 900. The brake system 900 is similar in structure and function as the brake system 600. Instead of using a single pumping valve 640, the system 900 includes a pair of pumping valves 902 and 904 in a parallel arrangement between a second pressure chamber 910 and boost conduit 912. It may be more cost effective to provide a pair of smaller valves than a single larger valve.

Figure 9:
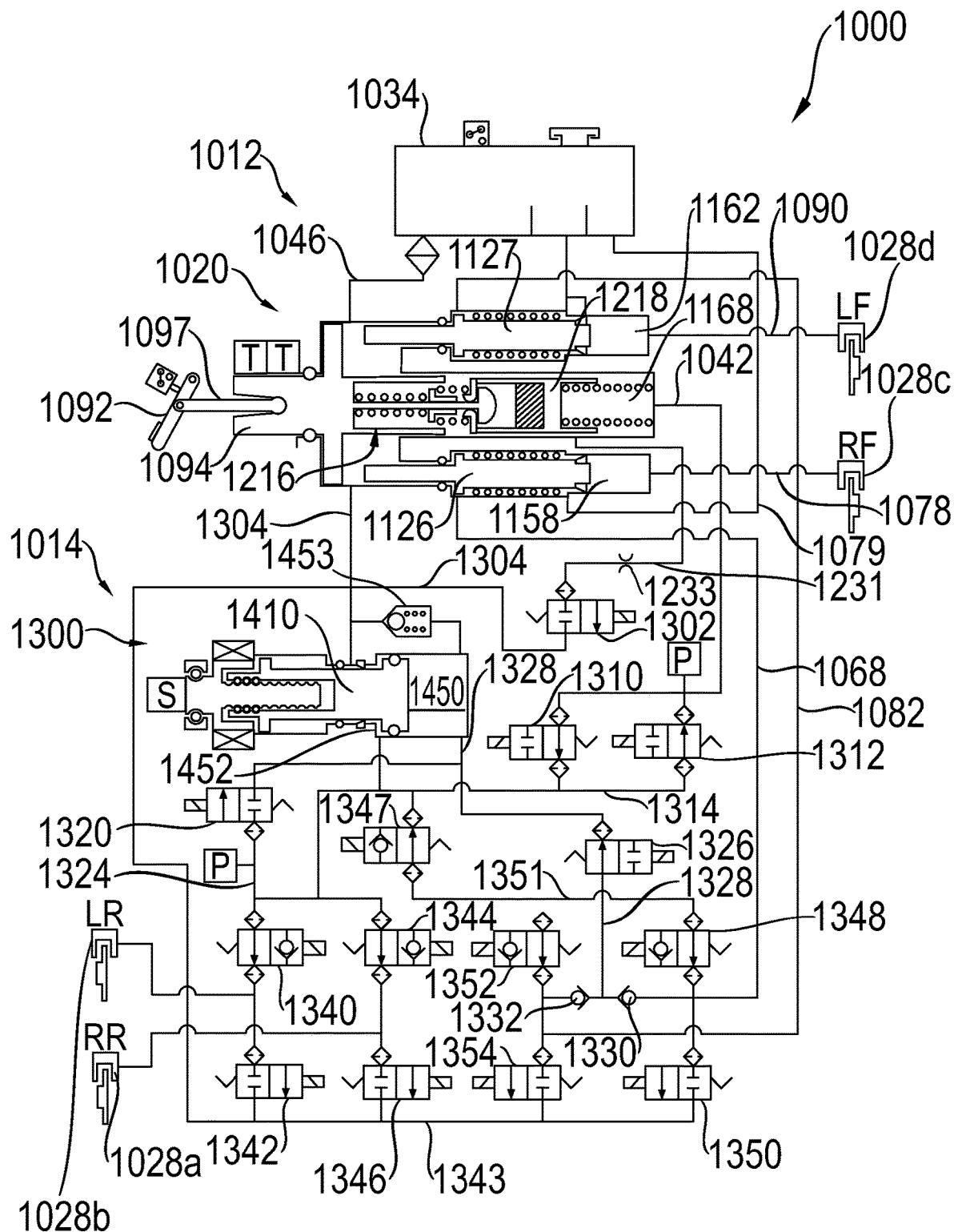
FIG. 9 is a schematic illustration of a fifth embodiment of a brake system.

There is illustrated in FIG. 9 a schematic illustration of a fifth embodiment of a brake system, indicated generally at 1000, which includes some of the same features as the brake systems described above. The brake system 1000 includes a brake pedal unit assembly, indicated generally at 1012, and a hydraulic control unit, indicated generally at 2014. The various components of the brake system 1000 are housed in the brake pedal unit assembly 1012 and the hydraulic control unit 1014. The brake pedal unit assembly 1012 and the hydraulic control unit 1014 may include one or more blocks or housings made from a solid material, such as aluminum, that has been drilled, machined, or otherwise formed to house the various components. Fluid conduits may also be formed in the housings to provide fluid passageways between the various components. The housings of the brake pedal unit assembly 1012 and the hydraulic control unit 1014 may be single structures or may be made of two or more parts assembled together. As schematically shown, the hydraulic control unit 1014 is located remotely from the brake pedal unit assembly 1012 with hydraulic lines hydraulically coupling the brake pedal unit assembly 1012 and the hydraulic control unit 1014. Alternatively, the brake pedal unit assembly 1012 and the hydraulic control unit 1014 may be housed in a single housing. It should also be understood that the grouping of components as illustrated in FIG. 9 is not intended to be limiting and any number of components may be housed in either of the housings.

The brake pedal unit assembly 1012 cooperatively acts with the hydraulic control unit 1014 for actuating a first wheel brake 1028*a* and a second wheel brake 1028*b*. The first and second wheel brakes 1028*a* and 1028*b* may be, for example, located on a rear vehicle axle. Additionally, brake pedal unit assembly 1012 cooperatively acts with the hydraulic control unit 1014 for actuating a third wheel brake 1028*c* and a fourth wheel brake 1028*d*. The third and fourth wheel brakes 1028*c* and 1028*d* may be, for example, located on a front vehicle axle. Each of the wheel brakes 1028*a-d* may be a conventional brake operated by the application of pressurized brake fluid. The wheel brake may be, for example, a brake caliper mounted on the vehicle to engage a frictional element (such as a brake disc) that rotates with a vehicle wheel to effect braking of the associated vehicle wheel.

Figure 10:
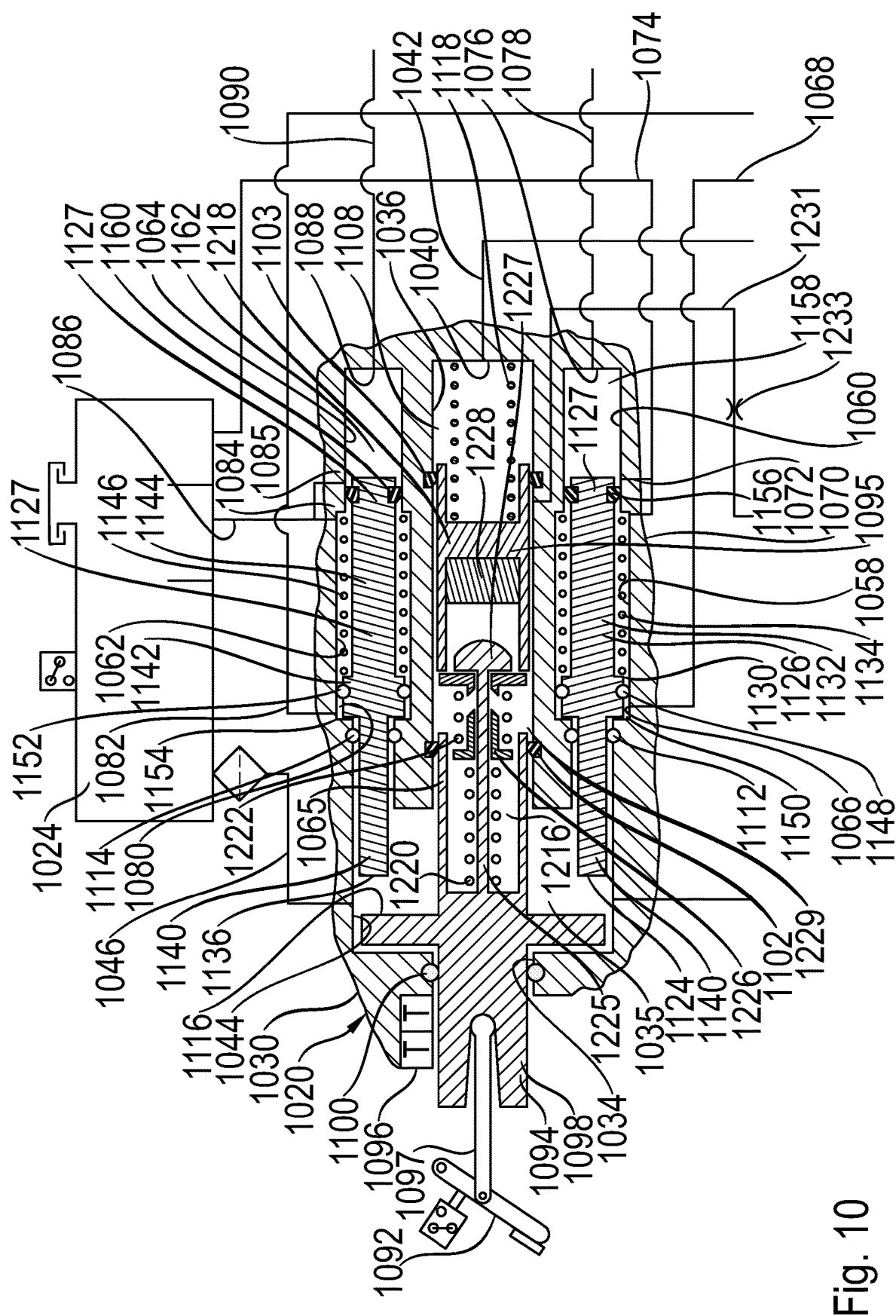
FIG. 10 is an enlarged schematic sectional view of the brake pedal unit assembly of the brake system of FIG. 9 shown in its rest position.

As shown in FIGS. 9 and 10, the brake pedal unit assembly 1012 includes a brake pedal unit 1020 in fluid communication with a reservoir 1024. The reservoir 1024 generally holds hydraulic fluid at atmospheric pressure. The brake pedal unit 1020 includes a housing 1030 having various bores formed in for slidably receiving various cylindrical pistons therein. The housing 1030 may be formed as a single unit or two or more separately formed portions coupled together.

As best shown in FIG. 10, the housing 1030 defines a first bore 1034, a cavity 1035, and a second bore 1036. The first and second bores 1034 and 1036 are axially aligned with one another. As will be discussed below, an input piston 1094 is slidably disposed in the first and second bores 1034 and 1036 and includes an intermediate portion disposed in the cavity 1035. A primary piston 1095 is slidably disposed in the second bore 1036. A first port 1040 formed in the second bore 1036 is in communication with a fluid conduit 1042. A second port 1044 formed in the cavity 1035 is in communication with a fluid conduit 1046 in communication with the reservoir 24.

The housing 1030 further includes a third bore 1058 and a fourth bore 1060 which is narrower than the third bore 1058. As will be discussed below, a first secondary piston 1126 is disposed in the third and fourth bores 1058 and 1060. The housing 1030 also includes a fifth bore 1062 and a sixth bore 1064 which is narrower than the fifth bore 1062. As will be discussed below, a second secondary piston 1127 is disposed in the fifth and sixth bores 1062 and 1064.

The housing 1030 also includes a third port 1066 in communication with a fluid conduit 1068. A fourth port 1070 and a fifth port 1072 are both in communication with a fluid conduit 1074 which is in communication with the reservoir 1024. A sixth port 1076 is in communication with a second brake fluid conduit 1078 which is in communication with the wheel brake 1028*c*.

The housing 1030 further includes a seventh port 1080 in communication with a fluid conduit 1082. An eighth port 1084 and a ninth port 1085 are both in communication with a fluid conduit 1086 which is in communication with the reservoir 1024. A tenth port 1088 is in communication with a third brake fluid conduit 1090 which is in communication with the wheel brake 28d.

A brake pedal 1092 is coupled to a first end of the input piston 1094 of the brake pedal unit 1020 via an input rod 1097. The system 1000 may further include one or more travel sensors 1096 for producing signals that are indicative of the length of travel of the brake pedal 1092. The input piston 1094 includes a first portion 1098 slidable within the first bore 1034. A seal 1100 is located between the inner surface of the first bore 1034 and the first portion 1098. The input piston 1094 includes a second portion 1104 slidable within the second bore 1036. A seal 1102 is located between the inner surface wall of the second bore 1036 and the outer wall of the second portion 1104.

The input piston 1094 further includes an abutment portion 1116 disposed with the cavity 1035. As will be explained below, the abutment portion 1116 may at selected times (such as during a failed condition of the brake system 1000), abut or engage with a first secondary piston 1126 and a second secondary piston 1127. The abutment portion 1116 can be any suitable feature or component integral with or connected to the input piston 1094 for engaging with the first and second secondary pistons 1126 and 1127.

The brake pedal unit 1020 includes a pedal simulator, indicated generally at 1216. The pedal simulator 1216 functions similarly as the pedal simulator 100 described above. The pedal simulator 1216 is disposed between the input piston 1094 and a primary piston 1218 slidably disposed in the bore 1036 for energizing a primary chamber 1108 which is in fluid communication with the port 1040. A return spring 1118 biases the primary piston 1218 towards the pedal simulator 1216. A seal 1103 provides for a unidirectional seal for preventing the flow of fluid from escaping from the primary chamber 1108. The primary chamber 1108 is defined by the second bore 1036, the primary piston 1218, and the seal 1103.

The pedal simulator 1216 may include springs 1220 and 1222 separated by a retainer 1224 slidably disposed on a pin 1225 formed on the input piston 1094. An end retainer 1226 engages the spring 1222 and an end 1227 of the pin 1225. Similar to the pedal simulator 100, the pedal simulator 1216 may include an elastomeric pad 1228 axially aligned with the end 1227 of the pin 1225. A pedal simulator chamber 1229 is defined by the seals 1102 and 1103, the input piston 1094, the primary piston 1218, and the bore 1036. The pedal simulator chamber 1229 is in fluid communication with a conduit 1231 having a restrictive orifice 1233 formed therein.

The first secondary piston 1126 includes a first end 1124 of a first portion 1128 that steps up to a second cylindrical portion 1130. The diameter of the second cylindrical portion 1130 is larger than the diameter of the first cylindrical portion 1128. The second cylindrical portion 1130 steps down to a third cylindrical portion 1132 of the first secondary piston 126. The diameter of the third cylindrical portion 1132 is smaller than the second cylindrical portion 1130. A first secondary piston spring 1134 is disposed about the circumference of the third cylindrical portion 1132. The ends of the first secondary piston spring 1134 are disposed between a stepped surface that transitions between the second cylindrical portion 1130 and the third cylindrical portion 1132, and a stepped portion that transitions between the fourth bore 1058 and the bore 1060.

The second secondary piston 1127 includes a first end 1136 of a first portion 1140 that steps up to a second portion 1142. A diameter of the second portion 1142 is larger than the diameter of the first portion 1140. The second portion 1142 steps down to a third portion 1144 of the second secondary piston 1127 that has a diameter smaller than the second portion 1142. A second secondary piston spring 1146 is disposed about the circumference of the third portion 1144. The ends of the first secondary piston spring 1146 are disposed between a stepped surface that transitions between the second portion 1142 and the third portion 1144, and a stepped portion transitioning between the bore 1062 and 1064. Positioning the secondary piston springs 1134 and 1146 about the circumference of the first secondary piston 1126 and the second secondary piston 1127, respectively, helps prevents each of the springs from buckling when compressed. In addition, the overall length of the brake pedal unit 1020 may be reduced as in contrast to packaging the respective secondary piston springs forward of the each respective secondary piston.

A seal 1148 is located between the outer surface of the second portion 1130 of the first secondary piston 1126 and the walls of the bore 1058. A seal 112 is located between the first portion 1128 of the first secondary piston 1126 and a wall of the cavity 1035. The seal 1148 and the seal 112 seal an intermediate chamber 1150 therebetween. Similarly, a seal 1152 is located between the outer surface of the second portion 1142 of the second secondary piston 1127 and the walls of the bore 1062. A seal 1114 is located between the first portion 1140 of the second secondary piston 1127 and a wall of the cavity 1035. The seal 1152 and the seal 1114 seal an intermediate chamber 1154 therebetween.

A seal 1156 is located between an outer surface of the third portion 1132 of the first secondary piston 1126 and the wall of the bore 1060. A first secondary chamber 1158 is defined by the seal 1156, the end of the first secondary piston 1126, and the inner walls of the bore 1060. A seal 1160 is located between an outer surface of the third portion 1144 of the second secondary piston 1127 and the wall of the bore 1064. A second secondary chamber 1162 is defined by the seal 1160, the end of the second secondary piston 1127, and the inner walls of the bore 1064.

The stepped secondary pistons 1126 and 1127 (more specifically, the third cylindrical portions 1132 and 1144 of the first secondary piston 1126 and the second secondary piston 1127, respectively) help compensate for rear bias during normal boost braking operations and lessens dynamic rear proportioning when no electric power is present. The third portions 1132 and 1144 may have smaller diameters than the respective second portions 1136 and 1142 of each respective secondary piston. This allows seal 1156 and seal 1160 disposed about the first and second secondary pistons 1126 and 1127, respectively, to be smaller. As the brake pedal 1092 is released, the respective secondary pistons 1126 and 1127 are dragged out of their respective bores 1060 and 1064, respectively, since the surface area of each respective piston 1126, 1127 in contact with the respective seals 1156 and 1160 have been reduced. As a result, less friction is generated as each secondary piston 1126 and 1127 slides in and out of their respective cylindrical bores 1060 and 1064.

In a preferred embodiment, the first secondary piston 1126 and the second secondary piston 1127 are parallel to one another and overlap one another. In yet another preferred embodiment, at least portions of the input piston 1094, the first secondary piston 1126, and the second secondary piston 1127 are parallel to one another and overlap one another. As is shown in FIG. 10, the right-hand portion of the input piston 9104 overlaps with the left-hand portions of the first and second secondary pistons. The overlap of the respective pistons minimizes the overall length (in a right to left direction as viewing FIG. 10) of the brake pedal unit 1020 which may enhance the feasibility of packaging the brake pedal unit in a vehicle.

Referring again to FIG. 9, the system 1000 includes a source of pressure in the form of a plunger assembly, indicated generally at 1300. The plunger assembly 1300 may be similar in structure and function as the plunger assemblies described above. The system 1000 uses the plunger assembly 1300 to provide a desired pressure level to the wheel brakes 1028a-d during a normal boosted brake apply. Fluid from the wheel brakes 1028a-d may be returned to the plunger assembly 1300 or diverted to the reservoir 1024.

The system 1000 further includes a solenoid actuated simulator valve 1302 movable between a closed position, as shown in FIG. 9, and an open position when the solenoid is actuated. In the open position, the simulator valve 1302 permits the flow of fluid between the conduit 1231 to the pedal simulator chamber 1229 and a conduit 1304 which is in fluid communication with the reservoir 1024 via the chamber 1035 and the conduit 1046.

The system 1000 further includes a pair of solenoid actuated base brake valves 1310 and 1312 which are each movable between an open position, as shown in FIG. 9, and a closed position when the solenoid is actuated. The pair of base brake valves 1310 and 1312 is arranged in parallel and is in fluid communication with the conduit 1042 and a conduit 1314. It should be understood that a single valve may be used instead of the pair of valves 1310 and 1312. It may be more cost effective to provide a pair of smaller valves than a single larger valve.

The system 1000 further includes a solenoid actuated replenishing valve 1320 which is movable between a closed position, as shown in FIG. 9, and an open position when the solenoid is actuated. The replenishing valve 1320 is in fluid communication with a conduit 1322 and a conduit 1324. The conduit 1324 is in fluid communication with the conduit 1314. A solenoid actuated bypass valve 1326 is movable between an open position, as shown in FIG. 9, and a closed position when the solenoid is actuated. The bypass valve is in fluid communication with the conduit 1322 and a conduit 1328. The conduit 1328 is in fluid communication with the conduit 1068 through a check valve 1330. The conduit 1328 is also in fluid communication with the conduit 1082 through a check valve 1332.

Similar to the brake systems described above, the system 1000 further includes various valves (slip control valve arrangement) for permitting controlled braking operations, such as ABS, traction control, vehicle stability control, and regenerative braking blending. A first set of valves includes an apply valve 1340 and a dump valve 1342 in fluid communication with the conduit 1324 for cooperatively supplying brake fluid to the wheel brake 1028b, and for cooperatively relieving pressurized brake fluid from the wheel brake 1028b to a reservoir conduit 1343 in fluid communication with the reservoir conduit 1304. A second set of valves include an apply valve 1344 and a dump valve 1346 in fluid communication with the conduit 1324 for cooperatively supplying brake fluid received from the boost valves to the wheel brake 1028a, and for cooperatively relieving pressurized brake fluid from the wheel brake 1028a to the reservoir conduit 1343. A third set of valves include an apply valve 1348 and a dump valve 350 in fluid communication with a conduit 1351 for cooperatively supplying brake fluid to the wheel brake 1028c via conduit 1068 (as will be explained below), and for cooperatively relieving pressurized brake fluid from the wheel brake 1028c to the reservoir conduit 1343. A fourth set of valves include an apply valve 1352 and a dump valve 1354 in fluid communication with the conduit 1326 for cooperatively supplying brake fluid received from the boost valves to the wheel brake 1028d via the conduit 1082 (as will be described below), and for cooperatively relieving pressurized brake fluid from the wheel brake 1028d to the reservoir conduit 1343.

The system 1000 may optionally include a solenoid actuated blending valve 1347 movable between an open position, as shown in FIG. 9, and a closed position when the solenoid is actuated. The blending valve 1347 is in fluid communication with the conduit 1314 and the conduit 1351. The blending valve 1347 may be added to the system 1000 if independent axle regeneration blending is desired.

As stated above, the system 1000 includes a source of pressure in the form of the plunger assembly 1300 to provide a desired pressure level to the wheel brakes 1028a-d. The plunger 1300 may be similar to the plunger 300 and, thus, a detailed description of the plunger 1300 will not be duplicated herein. The plunger 1300 includes a piston 1410 which may be moved in a forward and rearward direction. The plunger 1300 defines a first pressure chamber 1450 and a second pressure chamber 1452. The first pressure chamber 1450 is in fluid communication with the conduit 1322. The second pressure chamber 1452 is in fluid communication with the conduits 1314 and 1324. A spring biased check valve 1453 prevents fluid from flowing out of the first pressure chamber 1450 but permits the flow of fluid into the first pressure chamber 1450 via the conduit 1304 from the reservoir.

The following is a description of the operation of the brake system 1000. FIGS. 9 and 10 illustrate the brake system 1000 and the brake pedal unit 1020 in the rest position. In this condition, the driver is not depressing the brake pedal 1092. During a typical braking condition, the brake pedal 1092 is depressed by the driver of the vehicle. The brake pedal 1092 is coupled to the travel sensor(s) 1096 for producing a signal that is indicative of the length of travel of the input piston 1094 and providing the signal to an electronic control module (not shown). The control module may include a microprocessor. The control module receives various signals, processes signals, and controls the operation of various electrical components of the brake system 1000 in response to the received signals. The control module can be connected to various sensors such as pressure sensors, travel sensors, switches, wheel speed sensors, and steering angle sensors. The control module may also be connected to an external module (not shown) for receiving information related to yaw rate, lateral acceleration, longitudinal acceleration of the vehicle such as for controlling the brake system 1000 during vehicle stability operation. Additionally, the control module may be connected to the instrument cluster for collecting and supplying information related to warning indicators such as ABS warning light, brake fluid level warning light, and traction control/vehicle stability control indicator light.

During normal braking operations (normal boost apply braking operation) the plunger assembly 1300 is operated to provide boost pressure to the conduit 1322 for actuation of the wheel brakes 1028a-d. Under certain driving conditions, the control module communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending).

During a normal boost apply braking operation, the simulator valve 1302 is actuated to its open position to divert fluid through the simulation valve 1302 from the pedal simulator chamber 1229 to the reservoir 1204 via the conduits 1304 and 1046. Note that fluid flow from the simulator chamber 1229 to the reservoir 1204 is closed off once passageways 1065 in the input piston 1094 move past the seal 1102. Prior to movement of the input piston 1094, as shown in FIGS. 9 and 10, the simulation chamber 1229 is in fluid communication with the reservoir 1024 via the conduits 1065 and 1046.

During the duration of the normal braking mode, the simulator valve 1302 remains open permitting the fluid to flow from the simulation chamber 1229 to the reservoir 1024. The fluid within the simulation chamber 1229 is non-pressurized and is under very low pressures, such as atmospheric or low reservoir pressure. This non-pressurized configuration has an advantage of reducing seal friction and force hysteresis during normal low pedal effort boosted braking, thereby improving the pedal feel.

During the duration of the normal braking mode, the base brake valves 1310 and 1312 are actuated to their closed positions to prevent fluid from flowing out of the primary chamber 1108 of the brake pedal unit 1020 via the conduit 1042. This causes the primary piston 1218 to generally remain in a locked position permitting the springs of the pedal simulator 1216 to compress by movement of the input piston 1094 providing a force feedback to the driver. The base brake valves 1310 and 1312 generally isolate pressure from a boosted operation versus a manual push through operation, as will be described below.

During normal braking operations (normal boost apply braking operation) while the pedal simulator 1216 is being actuated by depression of the brake pedal 1092, the plunger assembly 1300 can be actuated by the electronic control unit to provide actuation of the wheel brakes 1028a-d. The plunger assembly 1300 may provide "boosted" or higher pressure levels to the wheel brakes 1028a-d compared to the pressure generated by the brake pedal unit 1020 by the driver depressing the brake pedal 1092. Thus, the system 1000 provides for assisted braking in which boosted pressure is supplied to the wheel brakes 1028a-d during a normal boost apply braking operation helping reduce the force required by the driver acting on the brake pedal 1092.

To actuate the wheel brakes 1028a-d via the plunger assembly 1300 when in its rest position, as shown in FIGS. 9 and 10, the electronic control unit energizes the replenishing valve 1320 to its opened position to permit flow of fluid through the replenishing valve 1320. The electronic control unit actuates the motor of the plunger 1300 in a first rotational direction to cause the piston 1410 to advance in the forward direction (rightward as viewing FIGS. 9 and 10). Movement of the piston 1410 causes a pressure increase in the first pressure chamber 1450 and fluid to flow out of the first pressure chamber 1450 and into the conduit 1322. The pressurized fluid in the conduit 1322 flows through the open replenishing valve 1320 and into the conduit 1324. The pressurized fluid within the conduit 1324 actuates the wheel brakes 1028a and 1028b through the open apply valves 1342 and 1340. Note that the dump valves 1346 and 1342 are closed preventing fluid from venting into the reservoir 1024.

To actuate the wheel brakes 1028c and 1028d, pressurized fluid from the first pressure chamber 1450 can be directed into the conduits 1068 and 1082 via a couple of different pathways. Note that fluid flowing into the conduits 1068 and 1082 will actuate the wheel brakes 1028c and 1028d through the brake pedal unit 1020, as will be described below. In a first pathway, fluid flows out of the first pressure chamber 1450, through the conduit 1322, through the replenishing valve 1320, through the conduit 1324, and through the open optional axle blending valve 1347 into the conduit 1351. Pressurized fluid in the conduit 1351 can then flow through the open apply valves 1348 and 1352 and into the conduits 1068 and 1082. In a second pathway, fluid flows out of the first pressure chamber 1450, through the conduit 1322 through the bypass valve 1326, through the conduit 1328, through the one way check valves 1330 and 1332, and into the conduits 1068 and 1082. Providing two pathways may be beneficial during a spike apply in which the flow of fluid into the conduits 1068 and 1082 very rapidly with a relatively large amount of fluid may be desirable. Since the orifices and flow paths within the apply valves 1348 and 1352 may be relatively small to provide a more efficient pressure modulation during slip control, the second pathway may provide a beneficial additional flow path into the conduits 1068 and 1082.

Pressurized fluid from the conduits 1068 and 1082 can be directed to the wheel brakes 1028c and 1028d, respectively, via the brake pedal unit 1020. More specifically, the pressurized fluid within the conduits 1068 and 1082 expands the intermediate chambers 1150 and 1154, respectively, of the brake pedal unit 1020. The pressurized hydraulic brake fluid entering the intermediate chambers 1150 and 1154 exerts a force on the first secondary piston 1126 and the second secondary piston 1127, respectively. The exerted force on the first and second secondary pistons 1126 and 1127 pressurizes the brake fluid in the first secondary chamber 1158 and the second secondary chamber 1162. The pressurized hydraulic brake fluid in the first secondary chamber 1158 is in fluid communication with wheel brake 1028c via the second brake fluid conduit 1078. Similarly, the pressurized hydraulic brake fluid in the second secondary chamber 1162 is in fluid communication with wheel brake 1028d via the third conduit 1090. During release of the brake pedal 1092, fluid may flow in the reverse direction than described above.

During a braking event, the electronic control module can also selectively actuate the apply valves 1340, 1344, 1348, and 1352 and the dump valves 1342, 1346, 1350, and 1354 to provide a desired pressure level to the wheel brakes 1028a-d.

In some situations, the piston 1410 of the plunger assembly 300 may reach its full stroke length and additional boosted pressure is still desired to be delivered to the wheel brakes 1028a-d. Similar to the plunger assembly 300, the plunger assembly 1300 may be a dual acting plunger assembly such that it is configured to also provide boosted pressure to the second pressure chamber 1452 when the piston 1410 is stroked rearwardly. In this situation, the replenishing valve 1320 is actuated to its closed position. Pressurized fluid from the conduit 1314 is directed through the apply valves 1340 and 1344 to the wheel brakes 1028b and 1028a. For actuation of the wheel brakes 1028c and 1028d, pressurized fluid from the conduit 1314 through the blending valve 1347 following the first pathway as described above. Note that the bypass valve 1312 may be actuated to its closed position, such as during a slip control operation. Fluid flows into the expanding first pressure chamber 1450 from the reservoir 1024 via the conduit 1304 and the check valve 1453. In a similar manner as during a forward stroke of the piston 1410, the electronic control module can also selectively actuate the apply valves 1340, 1344, 1348, and 1352 and the dump valves 1342, 1346, 1350, and 1354 to provide a desired pressure level to the wheel brakes 1028a-d.

In the event of an electrical brake failure or possibly some other failure, such as a leak, the brake system 1000 provides for manual braking or a manual push though operation. For example, during an electrical failure, the motor of the plunger assembly 1300 might cease to operate, thereby failing to produce pressurized hydraulic brake fluid at the first pressure chamber 1450. To provide manual braking, the driver exerts a higher force on the brake pedal 1092. The simulator valve 1302 is in its non-energized closed position. This essentially hydraulically locks the pedal simulator chamber 1229 preventing fluid from leaving the pedal simulator chamber 1229. Thus, the springs 1220 and 1222 of the pedal simulator 1300 will not compress. Movement of the input piston 1094 will cause movement of the primary piston 1218 due to the locked pedal simulator chamber 1229. The base brake valves 1310 and 1312 are in their non-energized open positions. This provides pressurized fluid from the primary chamber 1108 to flow through the base brake valves 1310 and 1312 into the conduit 1314. The wheel brakes 1028a and 1028b can be actuated by the flow of fluid through the apply valves 1340 and 1344. Fluid flow may also be directed into the conduits 1068 and 1082. Additionally, if a leak occurs in the conduits 1068, 1082, 1078, or 1090, during a manual push through operation the input piston 1094 can be used to manually push one or both of the first and second secondary pistons 1126 and 1127 in a right-ward direction, as viewing FIGS. 9 and 10. This will actuate one or both of the wheel brakes 1028c and 1028d. To apply manual push through for braking the front wheel brakes 1028c and 1028d, the driver may exert a generally longer travel on the brake pedal 1092. The longer travel displaces the input piston 1094 beyond the range used during normal boost operation. In this situation, the abutment portion 1116 of the input piston 1094 contacts the left-hand end portions of the first and second secondary pistons 1126 and 1127, respectively, as viewing FIG. 10. Thus, as viewing FIG. 10, rightward movement of the input piston 1094 will drive the secondary pistons 1126 and 1127 in the rightward direction. As the first and second secondary pistons 1126 and 1127 are displaced, brake fluid within the first and second secondary chambers 1158 and 1162 is pressurized, thereby exerting a force for actuating the front wheel brakes 1028c and 1028d. via the conduits 1078 and 1090, respectively. In the event leakage occurs in one of the secondary chambers, one of the front wheel brakes 1028c or 1028d may be used for braking since both (front) wheel brakes 1028c and 1028d are independently actuatable. Manual braking will be available for the rear wheel brakes 1028a and 1028b and for the respective front wheel brake 1028c or 1028d that maintains its hydraulic brake fluid conduit integrity.

Regenerative braking is typically applied to one of the respective axles of a vehicle for energy recapture by simultaneously reducing pressure while exerting an electromagnetic resistive force to the axle. During periods of braking when regenerative braking is applied to a respective axle for maximum recapture of energy, brake blending may occur so that the regenerative braking being applied to the respective axle does not create a torque imbalance between each axle of the vehicle. Too much wheel torque in a respective region of the vehicle may lead to a wheel slip condition. The optional blending valve 1347 is provided to assist during regenerative braking operations. For example, if regenerative braking is performed on the rear axle, it may be desirable to apply additional pressure to the front wheel brakes 1028c and 1028d to compensate. The blending valve 1347 can be energized accordingly to isolate the front wheel brake circuit from the rear wheel brake circuit. The plunger assembly 1300 can be actuated accordingly to provide a desired pressure level on each of the brake circuits by isolating the desired circuit by actuation of the blending valve 1347 and then permitting an increase in pressure by the plunger assembly 1300.

Figure 11:
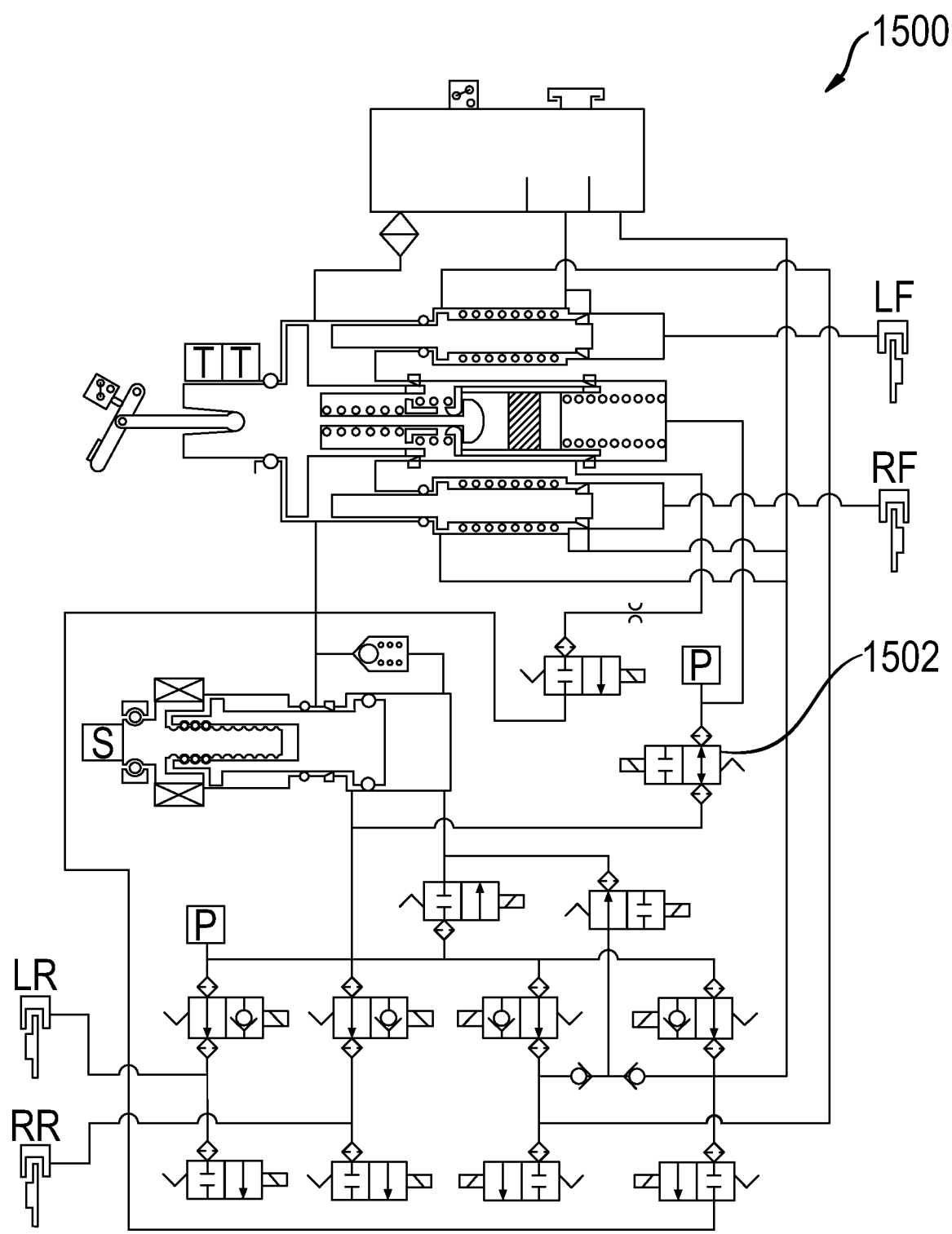
FIG. 11 is a schematic illustration of a sixth embodiment of a brake system.

There is illustrated in FIG. 11 an alternate embodiment of a brake system, indicated generally at 1500. The brake system 1500 is similar to the brake system 1000 described above with respect to FIGS. 9 and 10 and, therefore, similar features will not be described in duplicate. One of the differences is that the brake system 1500 uses only a single base brake valve 1502 instead of a pair of parallel arranged valves 1310 and 1312, as described above with respect to the brake system 1000. The use of a single valve may be used instead of a pair of valves to improve packaging space, weight or cost. Another difference between the brake systems 1000 and 1500 is that the brake system 1500 does not include the use of a blending valve, such as the optional blending valve 1347 of the brake system 1000.

Figure 12:
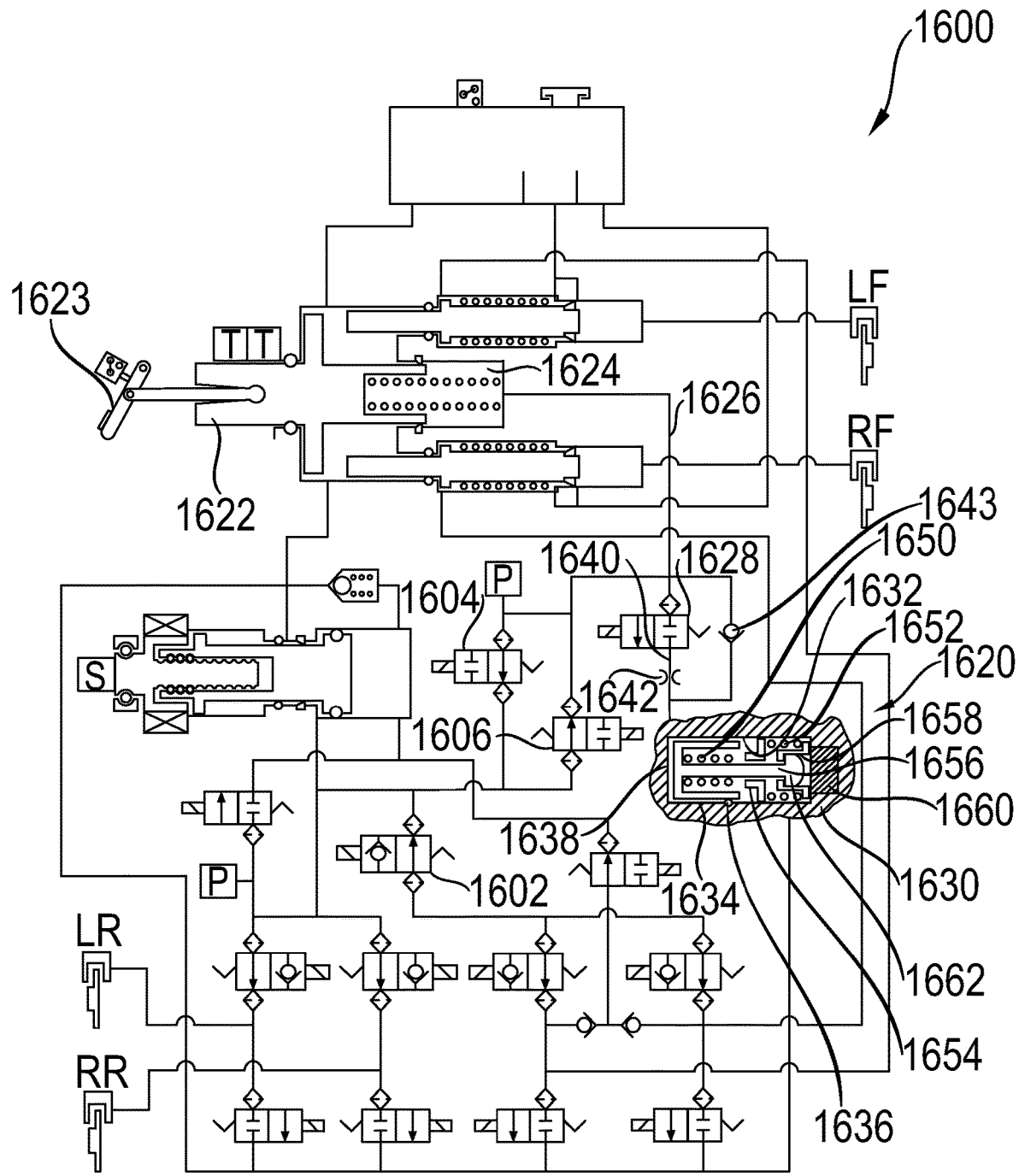
FIG. 12 is a schematic illustration of a seventh embodiment of a brake system.

There is illustrated in FIG. 12 an alternate embodiment of a brake system, indicated generally at 1600. The brake system 1600 is similar to the brake system 1000 described above with respect to FIGS. 9 and 10 and, therefore, similar features will not be described in duplicate. Unlike the brake system 1500, the brake system 1600 includes a blending valve 1602 and a pair of base brake valves 1604 and 1606 arranged in a parallel manner.

Another difference is that the brake system 1600 does not include a pedal simulator within a brake pedal unit 1610, but rather includes a pedal simulator, indicated generally at 1620, located remotely from the brake pedal unit 1620. Instead of being mechanically actuated by an input piston 1622 of the brake pedal unit 1620, the pedal simulator 1620 is hydraulically actuated. Movement of input piston 1622 energizes a pressure chamber 1624 which is in fluid communication with a conduit 1626. The conduit 1626 is in fluid communication with a solenoid actuated simulator valve 1628 which is movable between a closed position, as shown in FIG. 12, and an open position when actuated by the solenoid. The pedal simulator 1620 includes a housing 1630 having a bore 1632 formed therein. A piston 1634 is slidable disposed in the bore 1632 and sealing engages with a seal 1636. A pressure chamber 1638 is defined by the bore 1632, the piston 1634, and the seal 1636. The pressure chamber 1638 is in fluid communication with a conduit 1640 having a restricted orifice 1642 formed therein. The conduit 1640 is also in fluid communication with the simulator valve 1628. The pedal simulator 1620 has a caged spring design having a pair of springs 1650 and 1652 which may have different spring rates. A separating member 1654 engages with and separates the springs 1650 and 1652. The piston 1634 includes an outwardly extending pin 1656 engaged with a retainer 1658. The pedal simulator 1620 may also include an elastomeric pad 1660 which engages with an end 1662 of the pin 1656 after sufficient travel of the piston 1634. Compression of the elastomeric pad 1660 by the end 1662 of the pin 1656 may provide a different spring rate characteristic of the pedal simulator 1620 at this point of travel.

During a normal boosted operation of the brake system 1600, the input piston 1622 is advanced by a brake pedal 1623. Movement of the input piston 1622 pressurized the chamber 1624 and the conduit 1626. The simulator valve 1628 is actuated to its open position, thereby permitting the flow of fluid through the simulator valve 1628, the conduit 1640, and the orifice 1642. The flow of pressurized fluid enters into the chamber 1638 advancing the piston 1634 and compressing the springs 1650 and 1652, which provide a force feedback to the driver. Note that a check valve 1643 arranged parallel to the conduits 1626 and 1640 prevents the flow of fluid around the simulator valve 1628, but permits the flow of fluid around the simulator valve 1628 when the flow of fluid is in the direction from the chamber 1638 back into the chamber 1624.

Figure 13:
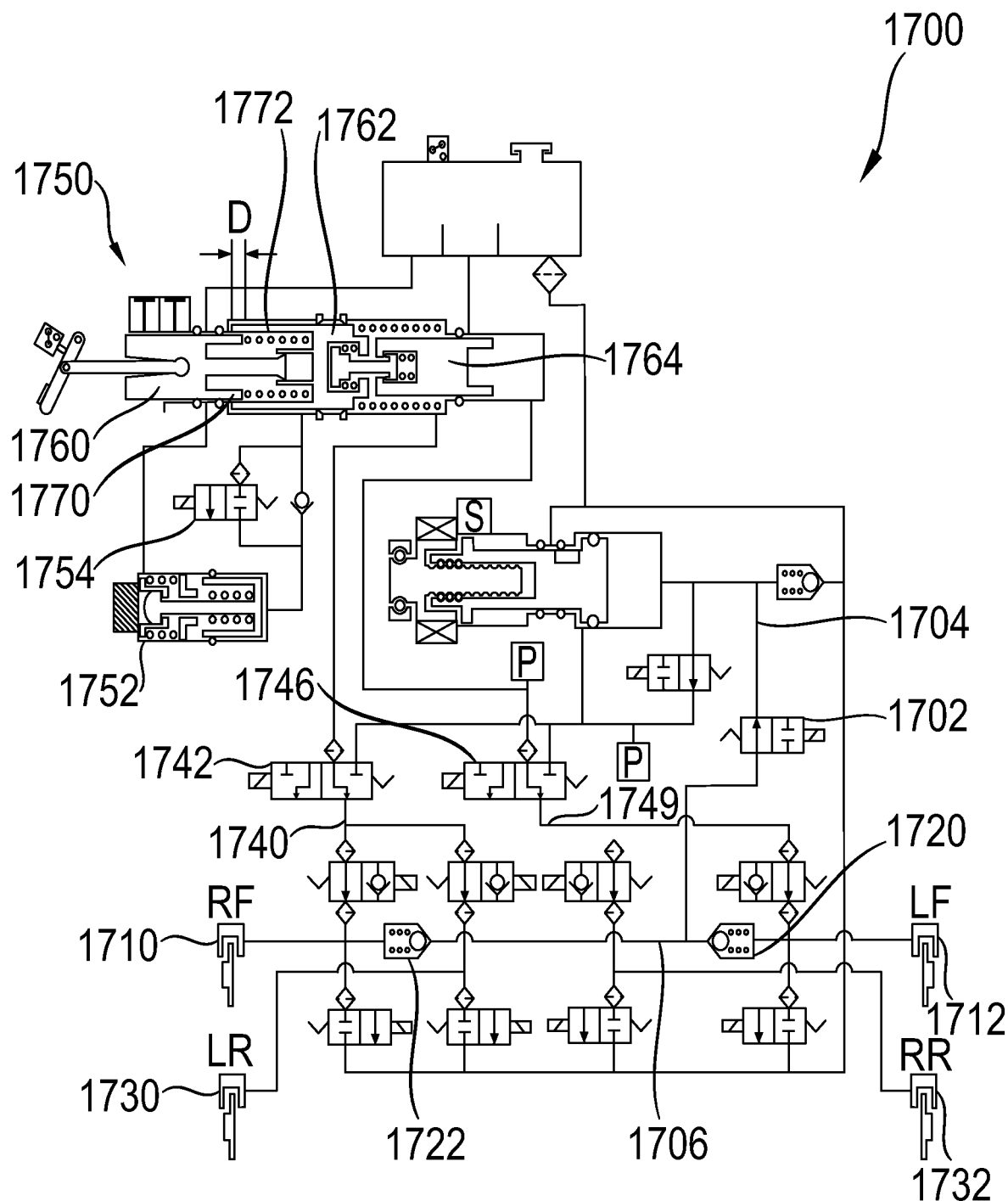
FIG. 13 is a schematic illustration of an eighth embodiment of a brake system.

There is illustrated in FIG. 13 an alternate embodiment of a brake system, indicated generally at 1700. The brake system 1700 is similar to the brake system 600 described above with respect to FIG. 5. One of the differences is that the brake system 600 includes a bypass valve 1702 which functions in a similar manner as the bypass valve 1326 of the brake system 1000 described above with respect to FIG. 9. The bypass valve 1702 provides a secondary pathway via conduits 1704 and 1706 for pressurizing wheel brakes 1710 and 1712. Check valves 1720 and 1722 are provided in the conduit 1706. The check valves 1720 and 1722 operated in a similar manner as the check valves 1330 and 1332 of the brake system 1000 in FIG. 9 as described above.

The brake system 1700 may be configured as a diagonally split system in which wheel brakes associated with opposite corner wheels are in one brake circuit and the other opposed corner wheel brakes are in another circuit. For example, the wheel brake 1710 may be associated with a right front wheel and a wheel brake 1730 may be associated with a left rear wheel. Fluid from a conduit 1740 from an exit port of a first isolation valve 1742 is in fluid communication with the wheel brakes 1710 and 1730. The wheel brake 1712 may be associated with a left front wheel and a wheel brake 1732 may be associated with a right rear wheel. Fluid from a conduit 1744 from an exit port of a first isolation valve 1746 is in fluid communication with the wheel brakes 1712 and 1732.

The brake system 1700 includes a brake pedal unit, indicated generally at 1750. A pedal simulator 1752 and simulator valve 1754 are located remotely from the brake pedal unit 1750. The pedal simulator 1752 and the simulator valve 1754 functions in a similar manner as the pedal simulator 1620 and the simulator valve 1628 of the brake system 1600 described above with respect to FIG. 12. The brake pedal unit 1750 includes an input piston 1760, a primary piston 1762, and a secondary piston 1764. Excluding the pedal simulator features, the brake pedal unit 1750 operates in a similar manner as the brake pedal unit 20 of the brake system 10 described above with respect to FIG. 1. One of the differences is that portions of the input piston 1760 overlaps portions of the primary piston 1762 in a radial direction. More specifically, the input piston 1760 includes a tubular extension 1770 which extends into a tubular extension 1772 of the primary piston 1762 by a distance D when the brake pedal unit 1750 is at rest, as shown in FIG. 13. This overlapping configuration helps to reduce the overall length of the brake pedal unit 1750 to provide a packaging advantage when installed into a vehicle's engine compartment. The reduction in length is provided by the overlapping distance D as well as not having to have an initial gap between the pistons.

Figure 14:
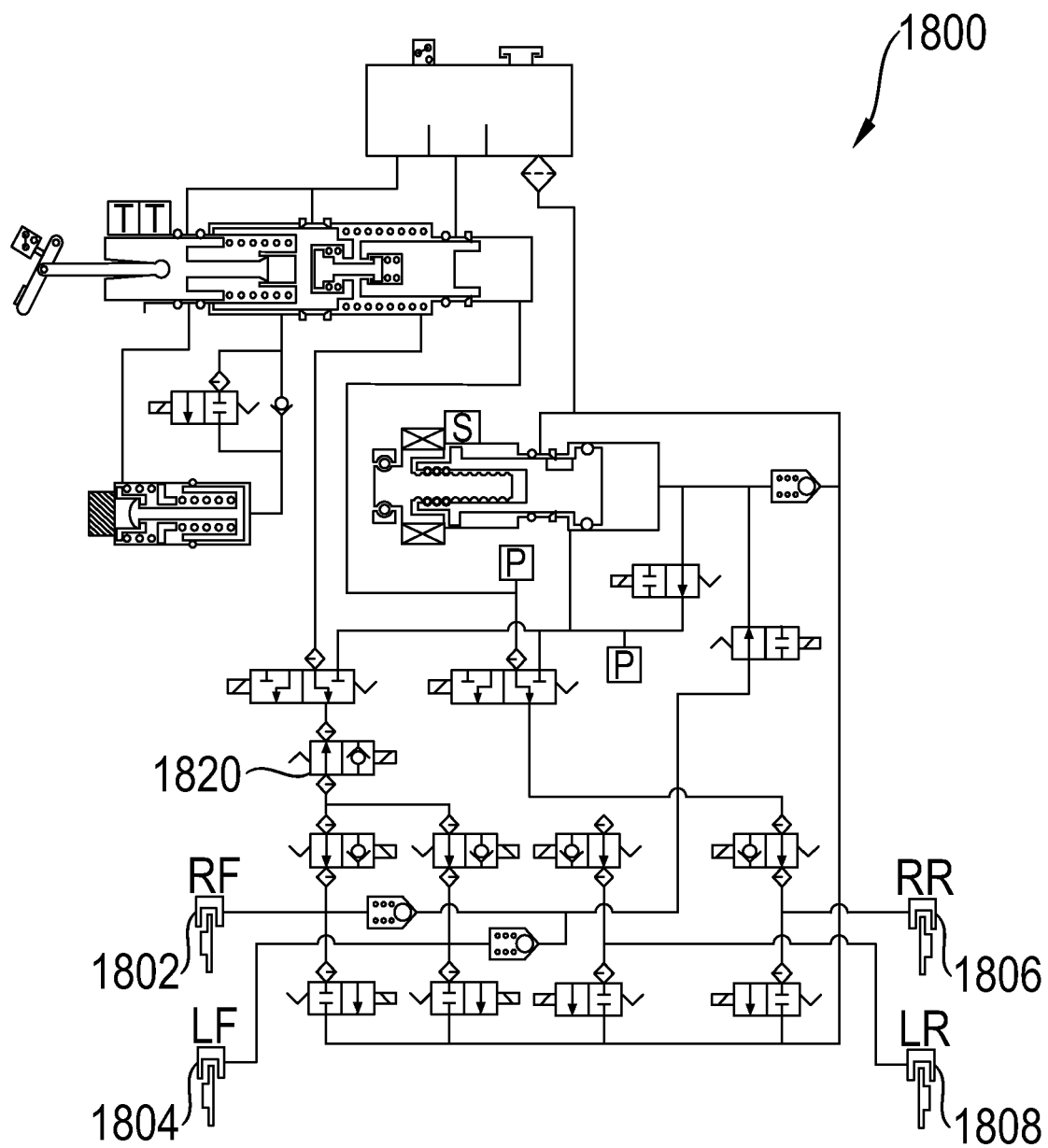
FIG. 14 is a schematic illustration of a ninth embodiment of a brake system.

There is illustrated in FIG. 14 an alternate embodiment of a brake system, indicated generally at 1800. The brake system 1800 is similar to the brake system 1700 described above with respect to FIG. 13. One of the differences is that the brake system 1800 may be configured as a vertically split system. For example, a wheel brake 1802 may be associated with a right front wheel, a wheel brake 1804 may be associated with a left front wheel, a wheel brake 1806 may be associated with a right rear wheel, and a wheel brake 1808 may be associated with a left rear wheel. The front wheel brakes 1802 and 1804 are on one fluid circuit and the rear wheel brakes 1806 and 1808 are on another fluid circuit. It should be understood that any of the brake systems described herein can be configured as a diagonally split system, a vertically split system, or any other configuration in which the wheel brakes are associated with desired wheel placements. In a split configuration system, the fluid of one fluid circuit does not mix with the fluid of another fluid circuit in manual push-through mode. A split configuration may also help to assure that if one of the fluid circuits has a catastrophic failure, such as a leak or component failure, that the wheel brakes of the other circuit will still be operable.

The brake system 1800 includes a solenoid actuated blending valve 1820 which operates in a similar manner as the blending valve 1347 of the brake system 1000 described above with respect to FIG. 9. The blending valve 1820 may be added to the system 1800 if independent axle regeneration blending is desired on the rear wheels for example.

During a braking event, the electronic control module can also selectively actuate the apply valves 1340, 1344, 1348, 1352 and dump valves 1342, 1346, 1350, and 1354 to provide a desired pressure level to the wheel brakes 1028a-d.

Figure 15:
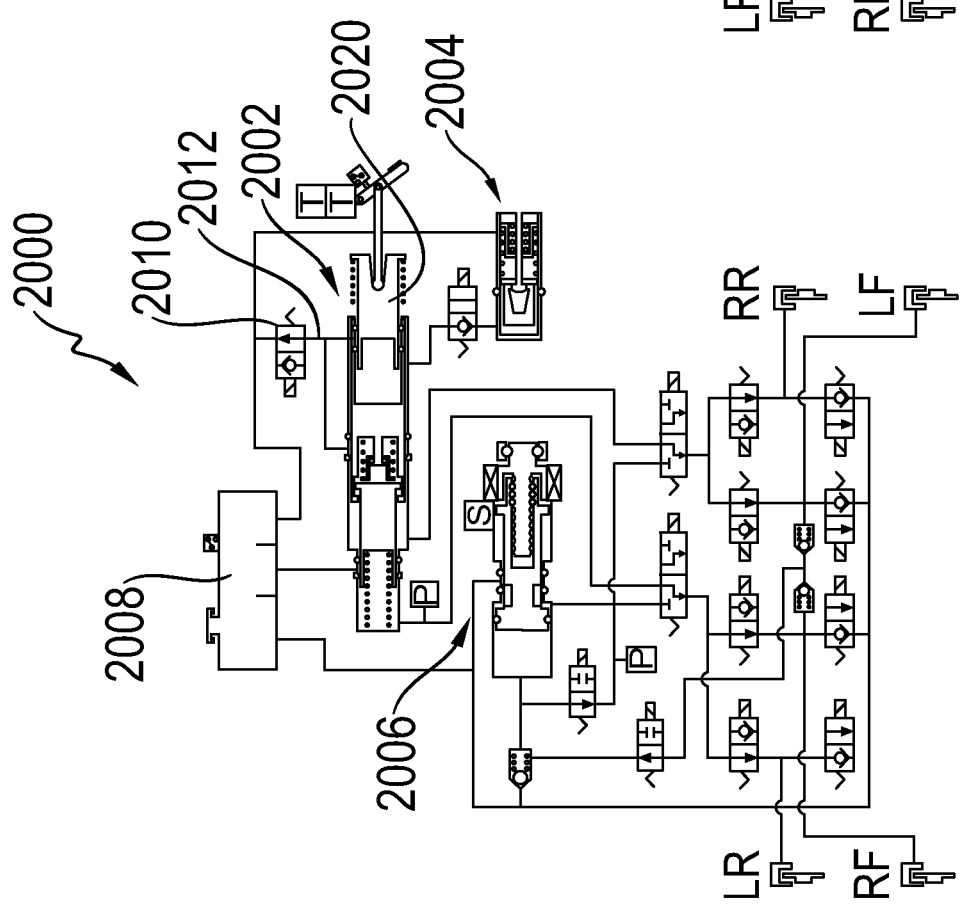
FIG. 15 is a schematic illustration of a tenth embodiment of a brake system.

There is illustrated in FIG. 15 an alternate embodiment of a brake system, indicated generally at 2000. The brake system 2000 is similar to the brake system 1700 described above with respect to FIG. 13. The brake system 2000 includes a brake pedal unit 2002, a pedal simulator 2004, a plunger assembly 2006, and a reservoir 2008 which may be similar in structure and function as described above with respect to other embodiments of brake systems described herein. One of the differences is that the brake system 2000 includes an optional simulator test valve 2010 which may be electronically controlled between an open position, as shown in FIG. 15, and a powered closed position. The simulator test valve 2010 is not necessarily needed during a normal boosted brake apply or for a manual push through mode. The simulator test valve 2010 can be actuated to a closed position during various testing modes to determine the correct operation of other components of the brake system 2000. For example, the simulator test valve 2010 may be actuated to a closed position to prevent venting to the reservoir 2008 via a conduit 2012 such that a pressure build up in the brake pedal unit 2002 can be used to monitor fluid flow to determine whether leaks may be occurring through seals of various components of the brake system 2000.

Figure 16:
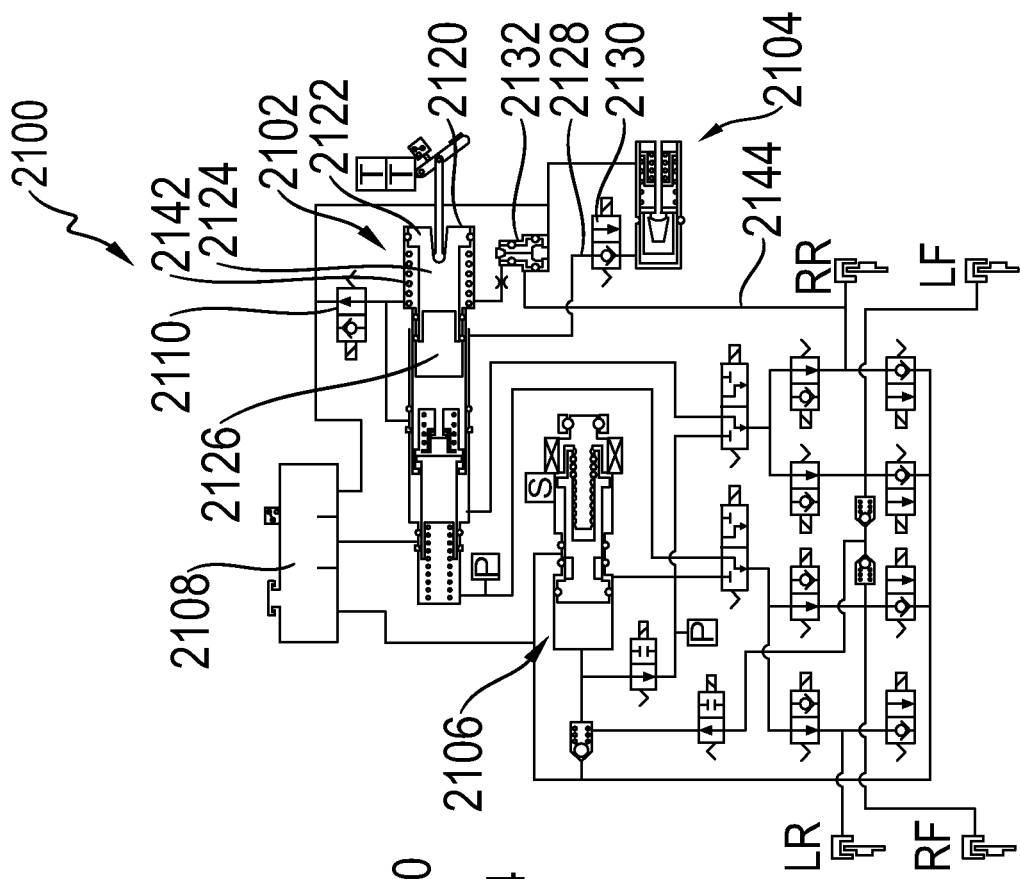
FIG. 16 is a schematic illustration of an eleventh embodiment of a brake system.

There is illustrated in FIG. 16 an alternate embodiment of a brake system, indicated generally at 2100. The brake system 2100 is similar to the brake system 2000 described above with respect to FIG. 14. The brake system 2100 includes a brake pedal unit 2102, a pedal simulator 2104, a plunger assembly 2106, a reservoir 2108, and a simulator test valve 2110 which may be similar in structure and function as described above with respect to other embodiments of brake systems described herein. One of the differences is that the brake pedal unit 2102 includes a stepped input piston 2120 compared to the single diameter input piston 2020 of the brake pedal unit 2002 in FIG. 15. The stepped input piston 2120 includes a large diameter portion 2122 and a small diameter portion 2124. Leftward motion of the stepped input piston 2120 causes the small diameter portion 2124 to pressurize a first fluid chamber 2126 in which the flow of fluid is diverted from the first fluid chamber 2126 into the pedal simulator 2104 via a conduit 2128 and a simulation valve 2130 when in its opened position. This flow path and actuation of the pedal simulator 2104 is similar to the operation of the brake systems described above. However, the brake system 2100 includes an additional quick fill or fast fill feature utilizing the input stepped piston 2120 such as during a manual push through operation. The structure and function of the stepped input piston 2120 may be similar to the stepped piston design shown and described in U.S. Pat. No. 5,557,935, which is incorporated by reference herein and attached hereto. This stepped input piston design provides a quick fill functionality that will reduce manual apply pedal travel and increase the available pressure for a given pedal force. The fast fill feature also utilizes a proportioning valve 2132 similar in operation and structure as the valve body 42 shown and described in U.S. Pat. No. 5,557,935. During actuation, pressure within an annular fast-fill pressurizing chamber 2142 of the brake pedal unit 2102 is increased due to leftward movement of the large diameter portion 2122. Fluid flows out of the fast-fill pressurizing chamber 2142 and regulated by the proportioning valve 2132 where fluid flow may be permitted to flow to the wheel brakes via a conduit 2144. The proportioning valve 2132 may meter the flow instead of causing an abrupt change in pressure. The proportioning valve 2132 may be configured to divert flow until a desired pressure level, such as around 7 bar. For example, when the pressure within the conduit 2144 reaches around 7 bar (or some other predetermined pressure), the proportioning valve 2132 vents the fast-fill pressurizing chamber 2142 to reservoir.

An L-type fixed seal 2150 may be replaced by a larger diameter L-type piston seal on the stepped piston 2120. This may provide adequate flow through the seal 2150 during a manual push through operation providing flow from the fast-fill pressurizing chamber 2142 into the first fluid chamber 2126 to advance the pistons of the brake pedal unit 2102 leftward during a manual push through event.

Figure 17:
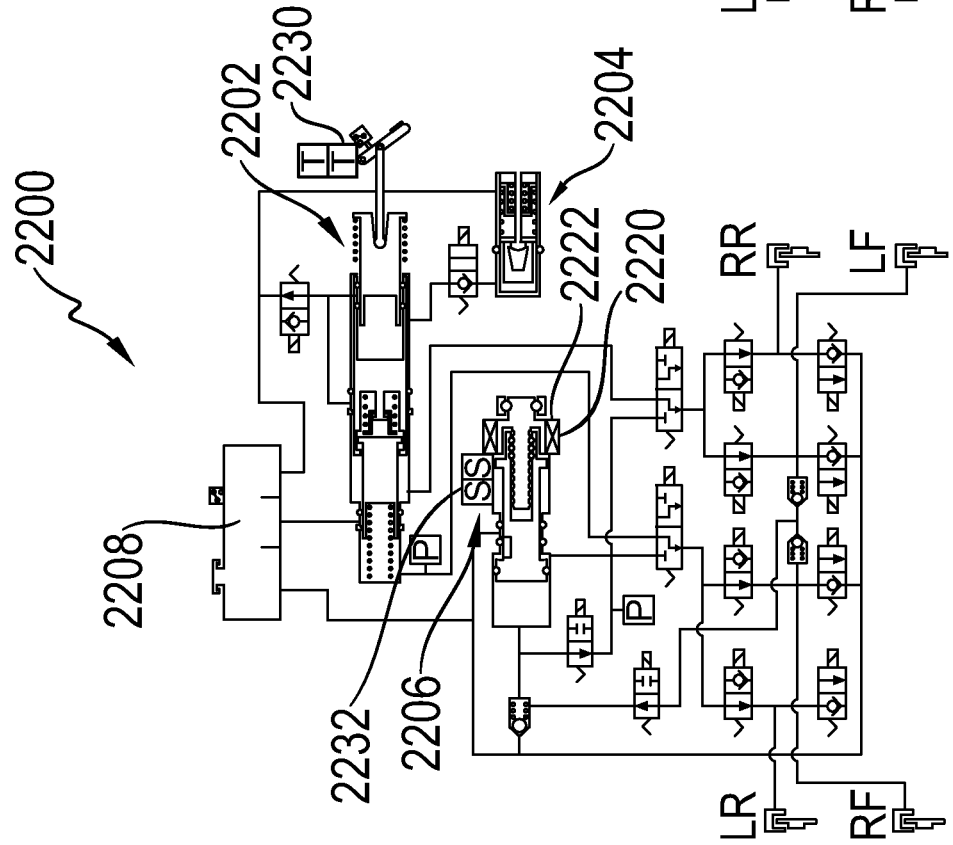
FIG. 17 is a schematic illustration of a twelfth embodiment of a brake system.

There is illustrated in FIG. 17 an alternate embodiment of a brake system, indicated generally at 2200. The brake system 2200 is similar to the brake system 2000 described above with respect to FIG. 14. The brake system 2200 includes a brake pedal unit 2202, a pedal simulator 2204, a plunger assembly 2206, and a reservoir 2208, which may be similar in structure and function as described above with respect to other embodiments of brake systems described herein. One of the differences is that the plunger assembly 2206 may include redundant control features such that the plunger assembly 2206 may be electrically controlled by another source, such as a secondary actuator (motor, stator, or coil, for example), indicated schematically at 2220 (outer), in addition to a primary motor, indicated generally at 2222 (inner). The inclusion of the secondary actuator 2220 adds redundancy to the brake system 2200 such that in case of a failure of the primary motor 2222, the secondary actuator 2220 may be actuated to control the plunger assembly 2206. The brake system 2200 may also include a redundant travel sensor 2230 to detect pedal travel and a redundant sensor 2232 to detect movement and/or position of the piston of the plunger assembly 2206. The secondary actuator 2220, the travel sensor 2230, and the sensor 2232 may be on a separate electrical circuit than the rest of the brake system 2200.

Figure 18:
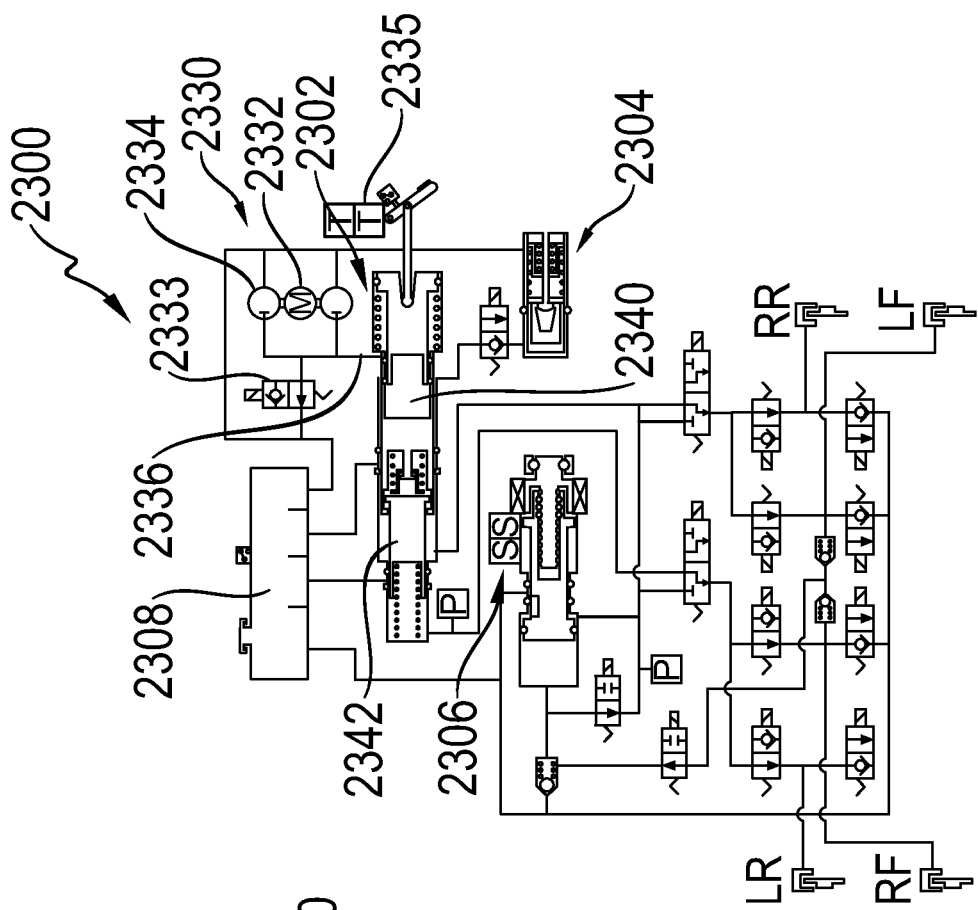
FIG. 18 is a schematic illustration of a thirteenth embodiment of a brake system.

There is illustrated in FIG. 18 an alternate embodiment of a brake system, indicated generally at 2300. The brake system 2300 is similar to the brake systems 2000 and 2200 described above. The brake system 2300 includes a brake pedal unit 2302, a pedal simulator 2304, a plunger assembly 2306, and a reservoir 2308, which may be similar in structure and function as described above with respect to other embodiments of brake systems described herein. One of the differences is that the brake system 2300 includes a secondary source 2330 having a motor 2332 and a pump assembly 2334 to provide a back-up boost function for improved manual push through operation, especially when the driver is not pushing on the brake pedal and therefore not providing fluid pressure at the brake pedal unit 2302. Under these conditions, the motor 2332 of the secondary source 2330 may be activated to drive the pump assembly 2334 to provide pressurized fluid to a conduit 2336 for advancing the pistons 2340 and 2342 of the brake pedal unit 2302. Advancement of the pistons 2340 and 2342 provides pressurized fluid the wheel brakes in a similar manner as the manual push through operations described above with respect the other brake systems in which the plunger assembly is bypassed. While the secondary source 2330 may add cost to the brake system 2300, the secondary source 2330 provides the ability to provide braking pressure to the wheel brakes in the event of a failure of the plunger assembly 2306 and when the driver is not pushing on the brake pedal. This brake system 2300, with the inclusion of the secondary source 2330, may also be used for fully autonomous vehicles wherein braking may be desired even through the driver is not operating the brake pedal. In this situation, the plunger assembly 2306 or the secondary source 2330 may be operated to provide pressure to the wheel brakes. In the event that the plunger assembly 2306 is experiencing a failed condition, the secondary source 2330 may be actuated. It may be desirable to have the motor 2332, the simulator test valve 2333, and a redundant pedal travel sensor 2335 be connected to a separate power supply such that the secondary source 2330 may be actuated even in the event of an electrical failure of the primary electrical circuit of the brake system 2300. The secondary source 2330 may also be actuated even if the driver is applying force to the brake pedal to provide an even greater pressure increase within the brake pedal unit 2302.

Figure 19:
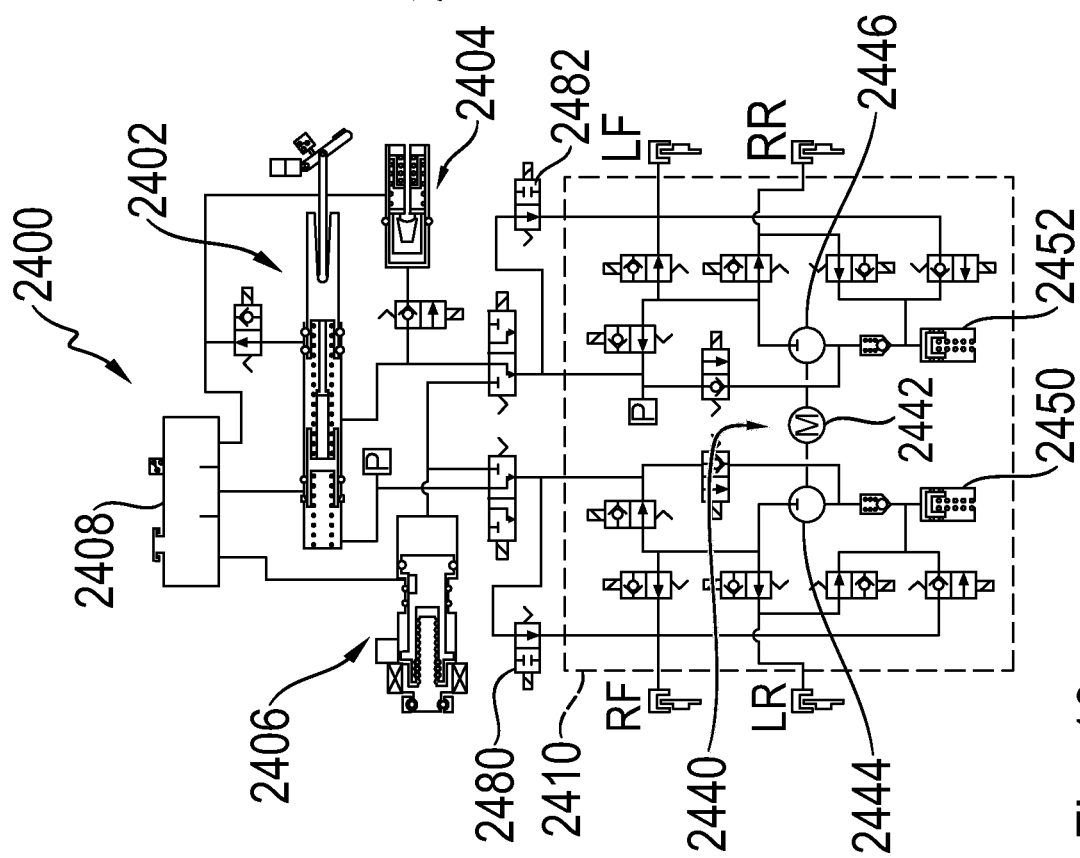
FIG. 19 is a schematic illustration of a fourteenth embodiment of a brake system.

There is illustrated in FIG. 19 an alternate embodiment of a brake system, indicated generally at 2400. The brake system 2400 is similar to the brake systems described above. The brake system 2400 includes a brake pedal unit 2402, a pedal simulator 2404, a plunger assembly 2406, and a reservoir 2408, which may be similar in structure and function as described above with respect to other embodiments of brake systems described herein. Note that the brake pedal unit 2402 may be simplified compared to the previously shown and described brake pedal units such that the pistons of the brake pedal unit 2402 are not stepped, thereby reducing the cost of the brake pedal unit 2402. One of the differences is that various components of the brake system 2400 may be included in a second housing, indicated generally by broken lines 2410, which may be located remotely from the remaining components of the brake system 2400. This arrangement may provide packaging improvements. The brake system 2400 includes a back-up boost function for improving manual push through performance in the form of a secondary source, indicated generally at 2440. The secondary source 2440 includes a motor 2442 and a pair of pumps 2444 and 2446 for each of the two brake circuits of the brake system 2400. Similar to brake system 2300, the secondary source 2440 may provide pressurized fluid to the wheel brakes during a failed condition of the plunger assembly 2406 and in the situation in which the driver is not pressing on the brake pedal. The brake system 2400 may include fluid accumulators 2450 and 2452 connected to inlets of the pumps 2444 and 2446. It may be desirable to have the motor 2332 and the solenoid actuated valves housed within the second housing 2410 to be connected to a separate power supply such that the secondary source 2440 may be actuated even in the event of an electrical failure of the primary electrical circuit of the brake system 2400. The brake system 2400 may include valves 2480 and 2482 for providing a secondary flow path for a spike apply event. Alternatively, the plunger assembly 2406 may be eliminated from the brake system 2400 such that the secondary source 2440 may provide normal boosted braking.

Figure 20:
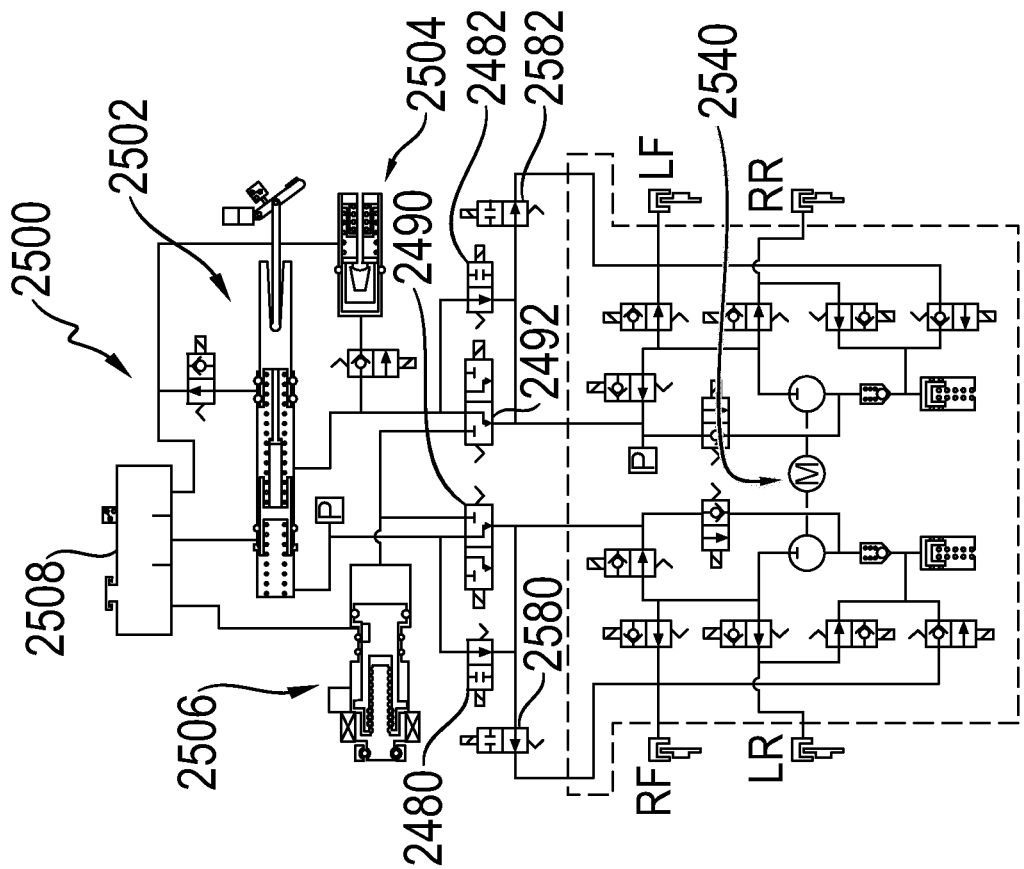
FIG. 20 is a schematic illustration of a fifteenth embodiment of a brake system.

There is illustrated in FIG. 20 an alternate embodiment of a brake system, indicated generally at 2500. The brake system 2500 is similar to the brake system 2400 described above. The brake system 2500 includes a brake pedal unit 2502, a pedal simulator 2504, a plunger assembly 2506, a reservoir 2508, and a secondary source 2540. One of the differences is that the brake system 2500 includes a bypass valve 2580 and 2582 for each brake circuit. Each bypass valve 2480 and 2482 is arranged in parallel to a respective isolation valve 2490 and 2492 to provide a secondary flow path when the bypass valves 2580 and 2582 are in their open positions. This secondary flow path may be useful if the physical structure of the isolation valves do not permit adequate flow through the open isolation valves. It may be cost prohibitive to design such isolation valves that provide the desired flow through such as during an autonomous braking event. Therefore, the inclusion of the bypass valves 2580 and 2582 may be less expensive than designing isolation valves (less restrictive orifices) capable of providing a desired flow therethrough.

Figure 21:
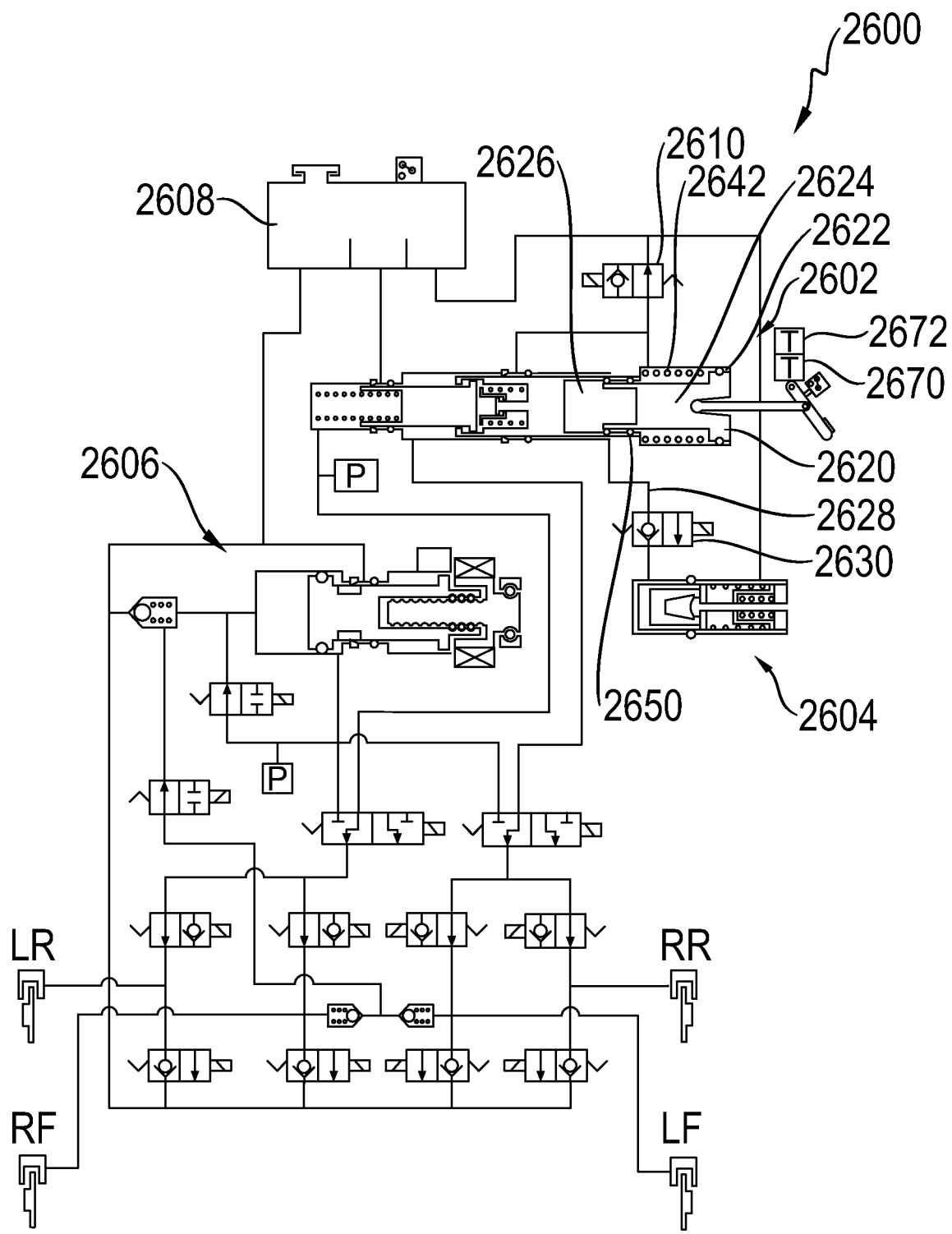
FIG. 21 is a schematic illustration of a sixteenth embodiment of a brake system.

There is illustrated in FIG. 21 an alternate embodiment of a brake system, indicated generally at 2600. The brake system 2600 is similar to the brake systems 2000 and 2100 shown and described with respect to FIGS. 15 and 16, respectively. The brake system 2600 includes a brake pedal unit 2602, a pedal simulator 2604, a plunger assembly 2606, and a reservoir 2608 which may be similar in structure and function as described above with respect to other embodiments of brake systems described herein. The brake system 2600 also includes a fast fill valve 2610. The fast fill valve 2610 may operate in a similar manner as the simulator test valve 2010 described above with respect to the brake system 2000 such that the fast fill valve 2610 may be electronically controlled between an open position, as shown in FIG. 21, and a closed position. The fast fill valve 2610 may be actuated to a closed position during various testing modes to determine the correct operation of other components of the brake system 2000.

In addition, the fast fill valve 2610 may further be used to perform a fast fill function as described above with respect to the brake system 2100. For example, the fast fill valve 2610 may be used in place of the proportioning valve 2132 of the brake system 2100. The fast fill valve 2610 may be configured to be operated in an electronically proportionally controlled manner and not merely a digital type on/off valve. Thus, the pressure and/or flow rate through the fast fill valve 2610 may be controlled between its extreme open and closed positions. Similar to the brake system 2100, the brake pedal unit 2602 of the brake system 2600 includes a stepped input piston 2620 having a large diameter portion 2622 and a small diameter portion 2624. Leftward motion of the stepped input piston 2620 causes the small diameter portion 2624 to pressurize a first fluid chamber 2626 in which the flow of fluid is diverted from the first fluid chamber 2626 into the pedal simulator 2604 via a conduit 2628 and a simulation valve 2630 when in its opened position. This flow path and actuation of the pedal simulator 2104 is similar to the operation of the brake systems described above during a normal boosted event. The fast fill valve 2610 may be energized to its closed position permitting flow from an annular fast-fill pressurizing chamber 2642 of the brake pedal unit 2602 to the first fluid chamber 2626. During a manual push through operation, an L-type fixed seal 2650 may be replaced by a larger diameter L-type piston seal on the stepped piston 2620 to provide adequate flow through the seal 2150 from the fast-fill pressurizing chamber 2642 into the first fluid chamber 2626 to advance the pistons of the brake pedal unit 2102 leftward. The fast fill valve 2610 can be proportionally controlled to vent to the fast fill pressurizing chamber 2642 to the reservoir 2608 at a desired pressure level.

The electronic control unit for the brake system 2600 may be configured to learn the pressure-volume relationship of the wheel brakes from the electronic control unit of the plunger assembly 2606. Based on this information and knowing the various piston diameters, orifice sizes, etc., the fast fill valve 2610 can be controlled based on input travel. The pressure control of the fast fill valve 2610 may be adjusted based on the driver's apply rate. The plunger assembly 2606 could be used to calibrate the control of the fast fill valve 2610 based on pressure feedback. During a fast fill mode, the fast fill valve 2610 may be controlled in an open loop manner. Input travel (brake pedal travel or piston 2620 travel) may be detected and monitored by a travel sensor 2670. A secondary travel sensor 2672 may additionally be used which may be connected in a different electrical circuit along with the control of the solenoid of the fast fill valve 2610 to function as a redundant or back up in case of electrical failure of the main circuit.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A plunger assembly for use as a pressure source for a brake system, the plunger assembly comprising:
   a brake pedal;
   a sensor arrangement for directly or indirectly measuring the pedal position or pedal force as the pedal is depressed by a vehicle driver;
   a housing having first and second ports;
   a reversible motor mounted on the housing for driving an actuator;
   a boost conduit for supplying fluid at a boosted pressure to one or vehicle brakes;
   a first outlet conduit connecting the first port to the boost conduit;
   a second outlet conduit connecting the second port to the boost conduit;
   a piston slidably mounted within the housing and, in part, defining first and second chambers on opposite sides of the piston, the piston operable via the reversible motor and the actuator to control pressure in the boost conduit as a function of the vehicle brake pedal position or force;
   an electronically controlled valve located in the first outlet conduit and switchable between open and closed positions;

an electronic control unit operates the piston in the following modes by the reversible motor and the actuator which are in communication with the electronic control unit:
- (a) a first pressure increasing mode wherein the valve is open and the piston is advanced in a first direction to cause fluid flow from the first chamber into both the boost conduit and the second chamber;
- (b) a pressure decreasing mode wherein the valve is open and the piston is retracted in a second opposite direction to cause fluid flow from the boost conduit and the second chamber into the first chamber; and
- (c) when in the first pressure increasing mode and the piston has advanced fully in the first direction, a second pressure increasing mode wherein the valve is closed and the piston is retracted in the second opposite direction to cause fluid flow into the boost conduit while fluid flow from the boost conduit into the first chamber is blocked by the valve; and
wherein in both the first and second pressure increasing modes, the electronic control unit together with the reversible motor, the actuator and the piston regulates the pressure in the boost conduit as a function of the vehicle brake pedal position or force.

2. The plunger assembly of claim 1 wherein the valve is a first valve and wherein an electronically controlled second valve is connected in parallel with the first valve.

3. The plunger assembly of claim 2 wherein the first and second valves are normally open.

4. The plunger assembly of claim 1 wherein the fluid flow into the second chamber is entirely from the first chamber in the first pressure increasing mode.

5. The plunger assembly of claim 1 wherein the second chamber is not configured to be filled from a reservoir.

6. The plunger assembly of claim 1 wherein the second chamber is not connected to a reservoir.

7. The plunger assembly of claim 1 wherein the second chamber cannot be fluidically decoupled from the boost conduit.

8. The plunger assembly of claim 1 wherein the second chamber lacks a check valve connection to a reservoir.

* * * * *